US012030617B2

(12) United States Patent
Huynh

(10) Patent No.: US 12,030,617 B2
(45) Date of Patent: Jul. 9, 2024

(54) SYSTEMS, METHODS, AND APPARATUS TO CONTROL AIRCRAFT ROLL OPERATIONS USING WING ACTUATORS

(71) Applicant: The Boeing Company, Chicago, IL (US)

(72) Inventor: Neal Van Huynh, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/898,132

(22) Filed: Aug. 29, 2022

(65) Prior Publication Data

US 2023/0125050 A1 Apr. 20, 2023

Related U.S. Application Data

(62) Division of application No. 16/786,301, filed on Feb. 10, 2020, now Pat. No. 11,618,552.

(51) Int. Cl.
*B64C 13/40* (2006.01)
*B64C 9/00* (2006.01)
(Continued)

(52) U.S. Cl.
CPC ............ *B64C 13/503* (2013.01); *B64C 9/04* (2013.01); *B64C 13/18* (2013.01); *B64C 13/40* (2013.01);
(Continued)

(58) Field of Classification Search
CPC ............... B64C 13/503; B64C 13/505; B64C 13/506; B64C 13/341; B64C 13/343; G05D 1/0808; G05D 1/0083
See application file for complete search history.

(56) References Cited

U.S. PATENT DOCUMENTS

| 6,625,982 B2 * | 9/2003 | Van Den Bossche | .... F15B 7/00 60/403 |
| 7,059,563 B2 * | 6/2006 | Huynh | .... B64C 13/00 244/226 |

(Continued)

OTHER PUBLICATIONS

United States and Patent and Trademark Office, "Notice of Allowance and Fee(s) Due, " issued in connection with U.S. Appl. No. 16/786,260, dated Nov. 19, 2021, 9 pages.

(Continued)

*Primary Examiner* — Joshua J Michener
*Assistant Examiner* — Ka Chun Leung
(74) *Attorney, Agent, or Firm* — HANLEY, FLIGHT & ZIMMERMAN, LLC

(57) ABSTRACT

Systems, methods, and apparatus for controlling aircraft roll operations are disclosed. An example system includes an aileron actuator including a mode selector valve to control fluid flow through the aileron actuator, and a valve spring coupled to the mode selector valve, the valve spring to adjust the mode selector valve from the active position to a block position, the block position to prevent fluid flow through the aileron actuator, a wing cable system coupled to the aileron actuator, a wing actuator coupled to the wing cable system, the wing actuator to control displacement of the aileron of the aircraft in response to the mode selector valve being in the block position, and a differential linkage coupled to the wing actuator and the aileron, the differential linkage to translate the displacement of the wing actuator into rotational movement to adjust the aileron from a first position to a second position.

20 Claims, 20 Drawing Sheets

(51) Int. Cl.
  *B64C 9/04*   (2006.01)
  *B64C 13/18*  (2006.01)
  *B64C 13/50*  (2006.01)
  *B64D 45/00*  (2006.01)
  *G05D 1/00*   (2024.01)

(52) U.S. Cl.
  CPC .......... *B64C 13/505* (2018.01); *B64C 13/506* (2018.01); *B64D 45/00* (2013.01); *G05D 1/101* (2013.01); *B64C 2009/005* (2013.01)

(56) References Cited

U.S. PATENT DOCUMENTS

| | | |
|---|---|---|
| 11,150,653 B1 | 10/2021 | Fannin et al. |
| 11,287,836 B2 | 3/2022 | Huynh |
| 2003/0127569 A1 | 7/2003 | Bacon et al. |
| 2004/0245386 A1 | 12/2004 | Huynh |
| 2006/0226285 A1 | 10/2006 | Matsui |
| 2011/0290353 A1 | 12/2011 | Fukui et al. |
| 2019/0176966 A1 | 6/2019 | Eddy et al. |
| 2021/0247779 A1 | 8/2021 | Huynh |

OTHER PUBLICATIONS

United States and Patent and Trademark Office, "Non-Final Rejection," issued in connection with U.S. Appl. No. 16/786,301, dated Aug. 10, 2022, 14 pages.

United States and Patent and Trademark Office, "Notice of Allowance and Fee(s) Due," issued in connection with U.S. Appl. No. 16/786,301, dated Feb. 1, 2023, 15 pages.

\* cited by examiner

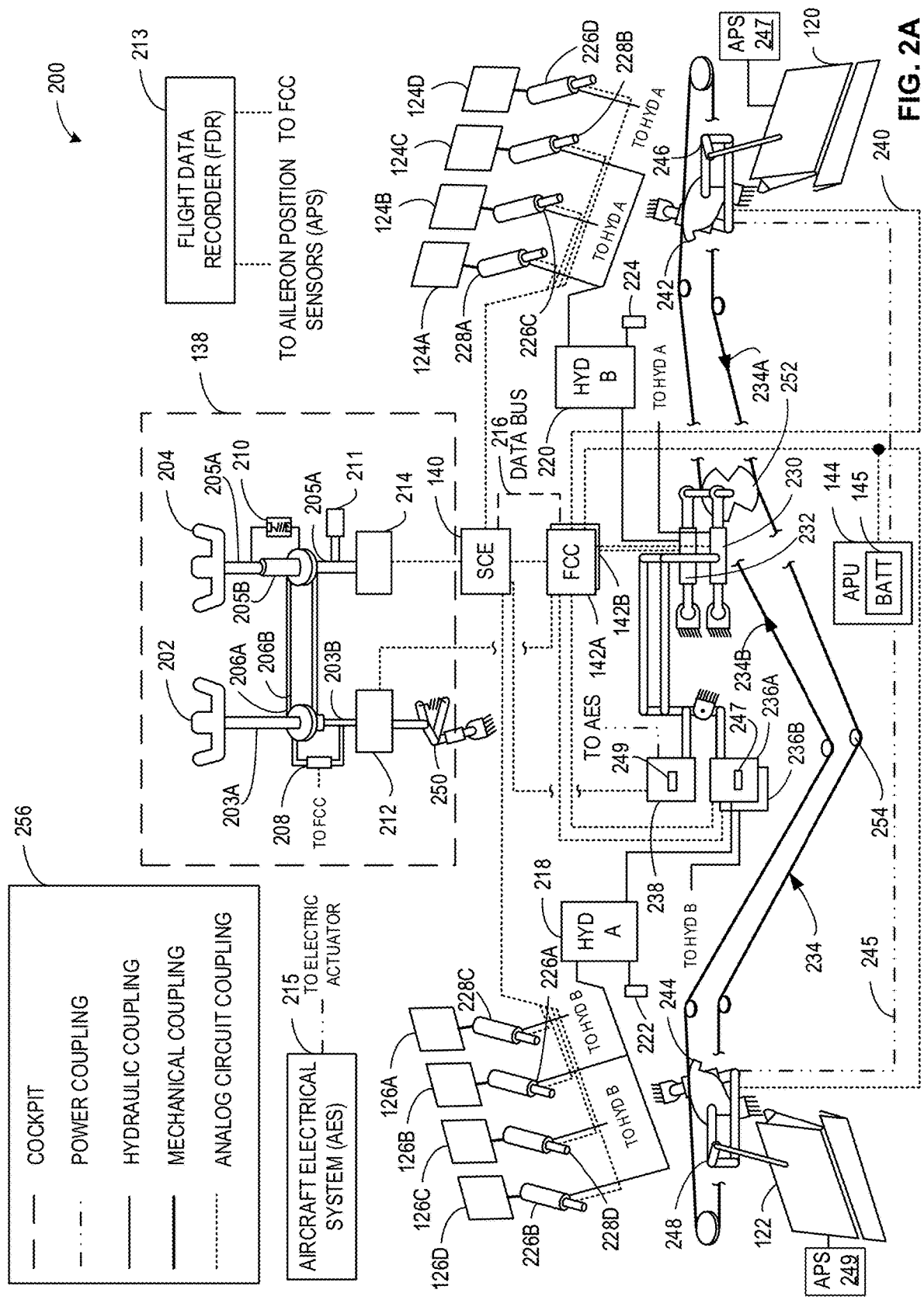

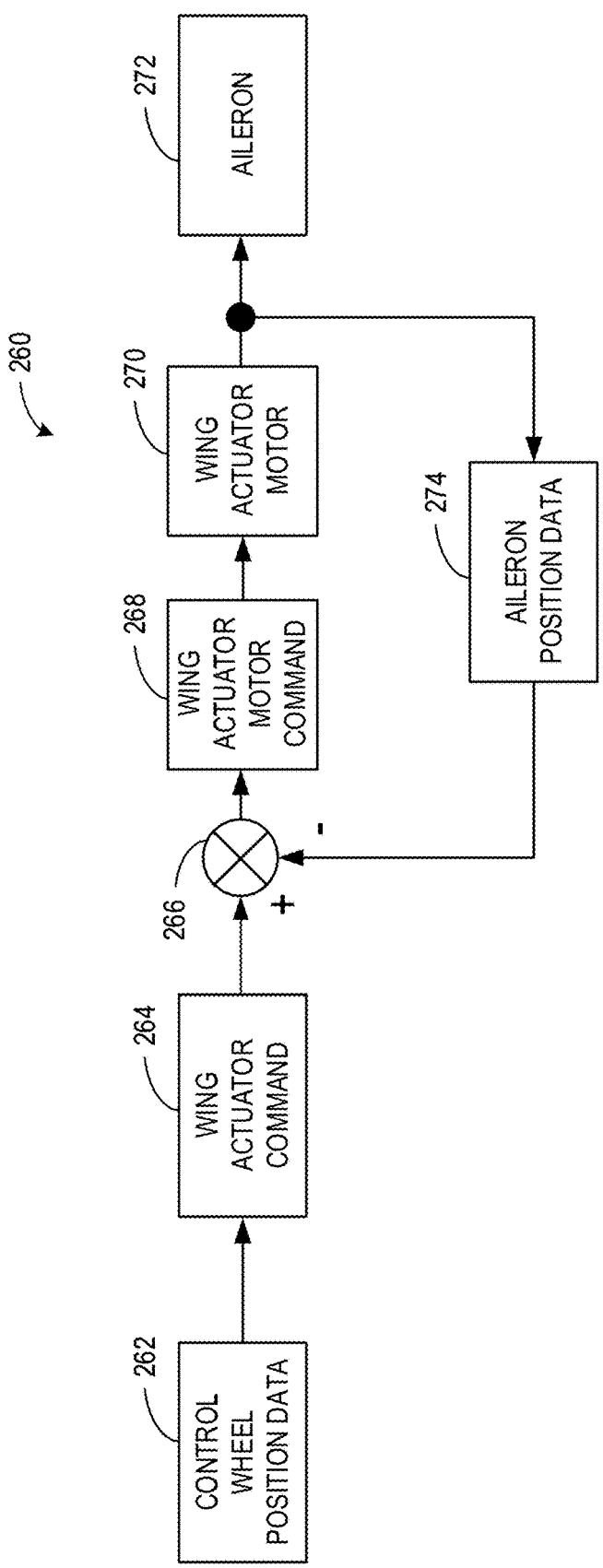

| SYSTEM COMPONENT | MANUAL FLIGHT CONTROL MODES | | | | | | |
|---|---|---|---|---|---|---|---|
| | NORMAL | NORMAL (HYDRAULIC (HYD) SYSTEM A OFF) | NORMAL (HYD SYSTEM B OFF) | ALTERNATE | | JAM INSIDE COCKPIT | JAM OUTSIDE COCKPIT |
| | | | | HYD A & B OFF | GENERIC FAULT | | |
| FIRST FLIGHT CONTROL COMPUTER (FCC) | ACTIVE | ACTIVE | ACTIVE | ACTIVE | | ACTIVE | ACTIVE |
| SECOND FCC | ACTIVE | ACTIVE | ACTIVE | | | ACTIVE | ACTIVE |
| SPOILER CONTROL ELECTRONIC (SCE) CONTROLLER | ACTIVE | ACTIVE | ACTIVE | ACTIVE | ACTIVE | ACTIVE | ACTIVE |
| FIRST MULTI-MODE (MM) ACTUATOR | ACTIVE | OFF | ACTIVE | OFF | OFF | ACTIVE | OFF |
| SECOND MM ACTUATOR | ACTIVE | ACTIVE | OFF | OFF | OFF | ACTIVE | OFF |
| ELECTRIC ACTUATOR | OFF | ACTIVE | ACTIVE | OFF | OFF | OFF | OFF |
| FIRST AILERON ACTUATOR | ACTIVE | ACTIVE | BYPASS | BLOCK | BLOCK | ACTIVE | BLOCK |
| SECOND AILERON ACTUATOR | ACTIVE | BYPASS | ACTIVE | BLOCK | BLOCK | ACTIVE | BLOCK |
| FIRST WING ACTUATOR | OFF | OFF | OFF | ACTIVE | ACTIVE | OFF | OFF |
| SECOND WING ACTUATOR | OFF | OFF | OFF | ACTIVE | ACTIVE | OFF | OFF |
| AILERON(S) | ACTIVE | ACTIVE | ACTIVE | ACTIVE | ACTIVE | ACTIVE* | BLOCK |
| SPOILER(S) | FULLY ACTIVE | PARTIALLY ACTIVE | PARTIALLY ACTIVE | OFF | OFF | ACTIVE* | FULLY ACTIVE |

ACTIVE* = ACTIVE WITH HALF-SYSTEM GAIN

FIG. 2C

| SYSTEM COMPONENT | AUTOPILOT FLIGHT CONTROL MODES | | | |
|---|---|---|---|---|
| | CATEGORY 3B | CATEGORY 3A MMEL 1 | CATEGORY 3A MMEL 2 | |
| FIRST FLIGHT CONTROL COMPUTER (FCC) | ACTIVE | OFF | ACTIVE | |
| SECOND FCC | ACTIVE | ACTIVE | OFF | |
| SPOILER CONTROL ELECTRONIC (SCE) CONTROLLER | ACTIVE | ACTIVE | ACTIVE | |
| FIRST MULTI-MODE (MM) ACTUATOR | ACTIVE | OFF | ACTIVE | |
| SECOND MM ACTUATOR | ACTIVE | ACTIVE | OFF | |
| ELECTRIC ACTUATOR | OFF | ACTIVE | ACTIVE | |
| FIRST AILERON ACTUATOR | ACTIVE | ACTIVE | ACTIVE | |
| SECOND AILERON ACTUATOR | ACTIVE | ACTIVE | ACTIVE | |
| FIRST WING ACTUATOR | OFF | OFF | OFF | |
| SECOND WING ACTUATOR | OFF | OFF | OFF | |
| AILERON(S) | ACTIVE | ACTIVE | ACTIVE | |
| SPOILER(S) | FULLY ACTIVE | FULLY ACTIVE | FULLY ACTIVE | |
| AUTOPILOT AVAILABILITY | YES | YES | YES | |

SYSTEMS, METHODS, AND APPARATUS TO CONTROL AIRCRAFT ROLL OPERATIONS USING WING ACTUATORS

RELATED APPLICATION

This patent arises from a divisional of U.S. patent application Ser. No. 16/786,301, (now U.S. Pat. No. 11,618,552) which was filed on Mar. 13, 2020. U.S. patent application Ser. No. 16/786,301 is hereby incorporated herein by reference in its entirety. Priority to U.S. patent application Ser. No. 16/786,301 is hereby claimed.

FIELD OF THE DISCLOSURE

This disclosure relates generally to aircraft and, more particularly, to systems, methods, and apparatus to control aircraft roll operations using wing actuators.

BACKGROUND

In recent years, larger aircraft wing designs with increased aerodynamic performance have led to improved aircraft payload capacity and longer flight range. Such aircraft wing designs can allow an aircraft to adjust flight control surfaces, such as spoilers and ailerons, to control roll operations during flight and achieve improved performance. However, larger aircraft wing designs can cause increased difficulty for a pilot exercising manual control.

SUMMARY

Systems, methods, and apparatus to control aircraft roll operations using wing actuators are disclosed herein.

An example system disclosed herein includes a wing actuator coupled to an aileron of an aircraft, an alternate power unit (APU), a control wheel position sensor to measure a control wheel position of a control wheel of the aircraft, a flight control computer (FCC) coupled to the APU and the control wheel position sensor, the FCC to invoke the APU to provide power to the wing actuator, and transmit a control signal to the wing actuator, the control signal to invoke the wing actuator to control the aileron based on the control wheel position, and a differential linkage coupled to the wing actuator and the aileron, the differential linkage to convert first movement of the wing actuator into second movement to control the aileron, the first movement of the wing actuator based on the control wheel position.

An example method disclosed herein includes instructing an alternate power unit (APU) to transmit power to a wing actuator based on an operating condition of an aircraft, measuring a control wheel position of a control wheel of the aircraft, and in response to first movement of the wing actuator being converted into second movement based on the control wheel position, controlling an aileron of the aircraft based on the second movement, the aileron coupled to the wing actuator.

Another example system disclosed herein includes an aileron actuator including a mode selector valve to control fluid flow through the aileron actuator, the mode selector valve configured to be in an active position to allow fluid flow through the aileron actuator, and a valve spring coupled to the mode selector valve, the valve spring to adjust the mode selector valve from the active position to a block position, the block position to prevent fluid flow through the aileron actuator, a wing cable system coupled to the aileron actuator, a wing actuator coupled to the wing cable system, the wing actuator to control displacement of an aileron of the aircraft in response to the mode selector valve being in the block position, and a differential linkage coupled to the wing actuator and the aileron, the differential linkage to translate the displacement of the wing actuator into rotational movement to adjust the aileron from a first position to a second position.

BRIEF DESCRIPTION OF THE DRAWINGS

FIG. 2A depicts an example implementation of an aircraft roll operation control system.

FIG. 2B depicts an example control loop to implement the aircraft roll operation control system of FIG. 2A.

FIG. 2C depicts a table of example manual flight control modes and example states of components included in the aircraft roll operation control system of FIG. 2A.

FIG. 2D depicts a table of example autopilot flight control modes and example states of components included in the aircraft roll operation control system of FIG. 2A.

Figure 1:
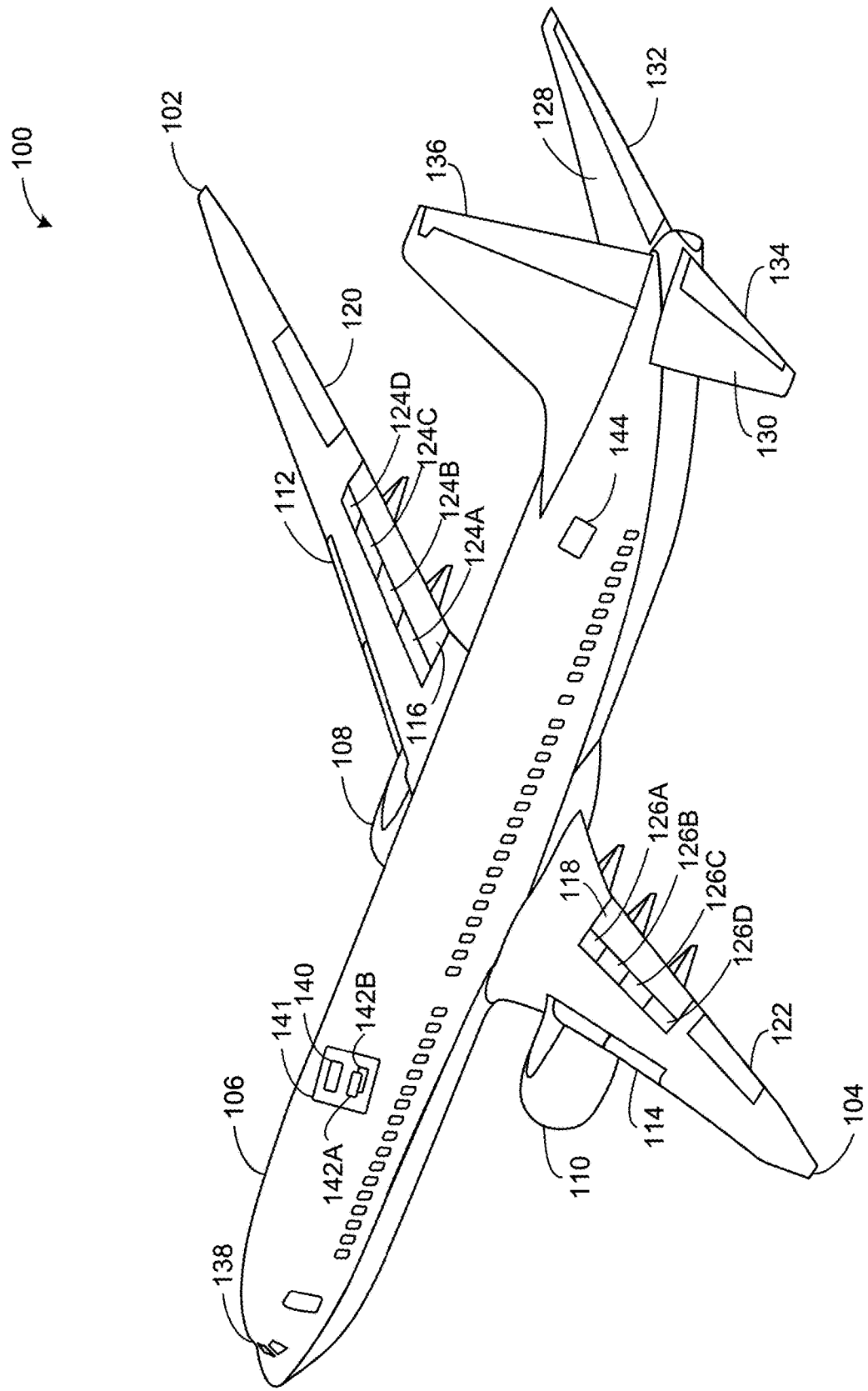
FIG. 1 illustrates an example aircraft that may implement the examples disclosed herein.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

DETAILED DESCRIPTION

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

In recent years, aircraft manufacturers have invested in aircraft designs to reduce fuel consumption by improving aerodynamic performance of commercial aircraft. Accordingly, the modern air transportation industry has moved towards designs of larger and/or improved aerodynamic performance aircraft. Improved aerodynamic performance allows for increased payload capacity and longer ranges of flight, thereby increasing commercial aircraft efficiency.

Development of entirely new planes to improve aircraft performance is often costly and time intensive. An alternative approach can be to add larger, more aerodynamic wings to current aircraft models. Such wings may include one or more flight control surfaces (e.g., an aileron, a spoiler, a slat, a flap, etc.) to facilitate flight of the aircraft by controlling the pitch, roll, yaw, etc., of the aircraft.

Ailerons are flight control surfaces that are typically located on a trailing edge of an aircraft wing and are used in pairs to control roll operations of the aircraft. Actuation of the ailerons results in roll, or movement about a longitudinal axis of the aircraft, and/or, more generally, a change in a flight path of the aircraft. Additionally or alternatively with the ailerons, spoilers can be used in roll operations. Typically, spoilers are located on a top surface of the aircraft wing and can extend in an upward direction to affect airflow above the aircraft wing. In some instances, spoilers create a controlled stall by greatly reducing lift of a section of the aircraft wing while increasing drag of the section, which can facilitate a controlled aircraft descent and/or roll operation.

Typical commercial aircraft are fly-by-wire (FBW), which can refer to conventional manual flight controls being replaced with an electrical interface. Movement of the manual flight controls can be converted to electrical signals and transmitted by electrical conductors to one or more controllers, such as a flight control computer (FCC). The FCC can generate flight commands to control actuators coupled to flight control surfaces that are associated with the electrical signals from the manual flight controls to execute intended operation(s). The flight control surface actuators can be powered by hydraulic power and/or electrical power. As described herein, a hybrid system (e.g., a hybrid power system) can refer to a power distribution system including hydraulic power, electrical power, and/or manual power (e.g., power associated with pilot input at a control wheel) to provide power to and/or otherwise control the flight control surface actuators to control the flight control surfaces.

In examples disclosed herein, in response to hydraulics not functioning properly, redundant control (e.g., alternate or backup control) options can be used to operate the aircraft. In examples disclosed herein, to improve aircraft control, redundant power sources can be used to control electrical system(s) in response to one of the power sources not responding to a command. In some examples, electric or electrical actuators can be used in response to hydraulic or hydraulic-powered actuators not responding to a command. The electric actuators can control the flight control surface actuators that control the flight control surfaces. In examples disclosed herein, in hybrid systems, manual controls can be used to control aircraft movement by controlling the flight control surface actuators. In some examples, in response to all digital control connections or digital control paths not functioning properly due to a generic fault or common mode failure caused by failure of all processors with similar hardware and/or with similar software, analog control connections or analog control paths can be used to command flight control actuators (e.g., aileron actuators, wing actuators, etc.) for controlling the flight control surfaces (e.g., the ailerons). Advantageously, examples disclosed herein can mitigate, reduce, and/or otherwise prevent an effect of generic error or common mode failure when flight control surfaces, such as an aileron, are controlled by an example actuator (e.g., a wing actuator) when the aircraft is being controlled in an alternate control mode.

Examples disclosed herein include an example aircraft roll operation control system to control aircraft roll operations by controlling flight control surfaces to perform aircraft operations such as pitch, roll, yaw, etc. The example aircraft roll operation control system includes an example FCC and an example spoiler control electronic (SCE) controller to control the flight control surfaces. For example, when a pilot changes a position of a control wheel, sensor(s) can determine control wheel pilot inputs and transmit the control wheel inputs to at least one of the FCC or the SCE controller. The example FCC and/or the example SCE controller can generate flight commands based on the control wheel inputs to control actuators that are coupled to different actuators, cables, flight control surfaces, etc., and/or a combination thereof.

In some disclosed examples, the aircraft roll operation control system includes two or more hydraulic systems and corresponding actuators on both sides of the aircraft to improve redundancy. In some disclosed examples, in response to one of the hydraulic systems being non-responsive (e.g., not responsive to a machine readable command, direction, or instruction), an example electric actuator can be used to control the actuators that are coupled to the hydraulic actuators, wing cables, flight control surfaces, etc. The example electric actuator can be powered by an example alternate power unit (APU) or any other secondary power source. In some examples, the electric actuator and/or the APU can be invoked regardless of a status of the hydraulic system(s).

In some disclosed examples, the aircraft roll operation control system includes wing actuators operatively coupled to the wings of the aircraft. In some disclosed examples, in response to one of the hydraulic systems not having an expected or threshold amount of pressure (e.g., hydraulic pressure), the wing actuators, coupled to a differential linkage system, can be used to control the aircraft ailerons. In such examples, the wing actuators are coupled (e.g., electrically coupled) to a respective one of the FCCs. For example, the FCC can obtain a control wheel position measurement from one of the control wheel position sensors and transmit a command to one of the wing actuators based on the position measurement, where the command can be transmitted via an analog circuit (e.g., an analog circuit coupling). In such examples, the SCE controller and/or the FCCs can activate an analog signal output to control one(s) of the wing actuators. In some disclosed examples, the analog circuit enables transmission of analog signals from the FCC to the wing actuators, where the analog signals are based on measurements from the control wheel position sensors. Advantageously, the analog circuit enables communication between electrical components (e.g., one or more of the FCCs, actuators, sensors, etc.) without the need for analog signals to be converted into digital signals for processor-based control.

In some disclosed examples, the aircraft roll operation control system controls aircraft roll operations based on autopilot and/or, more generally, multi-mode flight commands. The example FCC and/or the example SCE controller can generate the autopilot flight commands based on aircraft or flight parameters to control actuators and/or corresponding flight control surfaces to execute changes in aircraft movement. For example, the FCC and/or the SCE controller operating in autopilot can generate autopilot flight commands based on aircraft parameters without the control wheel pilot inputs from the pilot. For example, a flight command can correspond to one or more directions, instructions, invocations, etc., to one or more components associated with a flight control surface to control movement and/or otherwise control displacement of the flight control surface from a first position to a second position, a first angle to a second angle, etc., and/or a combination thereof.

In some disclosed examples, the FCC and/or the SCE controller operating in autopilot (e.g., autopilot mode) can generate command(s) to actuate a back-drive actuator, which displaces the control wheels an amount proportional to the commanded control surface displacement. The back-drive actuator can back-drive the control wheel(s) to provide physical and/or visual feedback to the pilot that the autopilot system is in control of the aircraft.

In some disclosed examples, the aircraft roll operation control system controls aircraft roll operations based on pilot input commands. The example FCC and/or the example SCE controller can generate flight commands based on the control wheel position and/or control wheel force to execute changes in aircraft movement.

In some disclosed examples, a jam in connection with a control wheel (e.g., a jammed control wheel) during manual flight (e.g., the aircraft not operating in autopilot mode) can be overcome. For example, a pilot input force at a non-jammed control wheel can break out a jam-override device to regain control of the ailerons and/or spoilers. In such examples, the system gain is one-half of the system gain when operating with two non-jammed control wheels. The system gain is one-half of the normal gain because only one of the two wheel position sensors follows the position of the non-jammed control wheel. In other examples, if a jam occurs not in connection with the control wheels, the pilot input at either control wheel can result in control of the ailerons with normal or full system gain.

FIG. 1 is a schematic illustration of an example aircraft 100. The aircraft 100 includes example wings 102, 104 coupled to an example fuselage 106. The wings 102, 104 include a first example wing 102 on a first side of the aircraft 100 and a second example wing 104 on a second side of the aircraft 100, where the first side is opposite the second side. Example engines 108, 110 are coupled to the wings 102, 104. The engines 108, 110 include a first example engine 108 coupled to the first wing 102 and a second example engine 110 coupled to the second wing 104.

In FIG. 1, the aircraft 100 includes example slats 112, 114, example flaps 116, 118, example ailerons 120, 122, and example spoilers 124A-D, 126A-D, operatively coupled to the wings 102, 104. The slats 112, 114 include a first example slat 112 operatively coupled to the first wing 102 and a second example slat 114 operatively coupled to the second wing 104. The ailerons 120, 122 include a first example aileron 120 operatively coupled to the first wing 102 and a second example aileron 122 operatively coupled to the second wing 104. The spoilers 124A-D, 126A-D include a first example spoiler 124A, a second example spoiler 124B, a third example spoiler 124C, and a fourth example spoiler 124D operatively coupled to the first wing 102. The spoilers 124A-D, 126A-D include a first example spoiler 126A, a second example spoiler 126B, a third example spoiler 126C, and a fourth example spoiler 124D operatively coupled to the second wing 104.

Additional control surfaces of the aircraft 100 include example horizontal stabilizers 128, 130 operatively coupled to example elevators 132, 134 and an example vertical stabilizer 136 coupled to the fuselage 106. The horizontal stabilizers 128, 130 include a first example horizontal stabilizer 128 on the first side of the aircraft 100 and a second example horizontal stabilizer 130 on the second side of the aircraft 100. The elevators 132, 134 include a first example elevator 132 operatively coupled to the first horizontal stabilizer 128 and a second example elevator 134 operatively coupled to the second horizontal stabilizer 130.

In the illustrated example of FIG. 1, the aircraft 100 includes an example cockpit 138. In FIG. 1, the cockpit 138 is a flight deck area or portion of the plane that houses one or more pilots and corresponding pilot controls. In FIG. 1, the aircraft 100 includes an example spoiler control electronic (SCE) controller 140 to obtain control wheel sensor data and/or control one or more flight control surfaces of the aircraft 100. Alternatively, the aircraft 100 may include more than one of the SCE controller 140. For example, the aircraft 100 can include more than one of the SCE controller 140 when spoiler actuation is to be controlled. In FIG. 1, the SCE controller 140 is located in and/or otherwise proximate to an example electrical and electronic (EE) compartment 141 of the aircraft 100. For example, the SCE controller 140 can be in the EE compartment 141 and/or, more generally, in front of the engines 108, 110. Alternatively, one or more of the SCE controller 140 may be located elsewhere in the aircraft 100 than depicted in FIG. 1.

In the illustrated example of FIG. 1, the aircraft 100 includes a first example flight control computer (FCC) 142A and a second example FCC 142B to obtain control wheel sensor data and/or control one or more flight control surfaces of the aircraft 100. In examples disclosed herein, the first FCC 142A and the second FCC 142B are redundant computers and can perform the same or substantially similar operations, functions, controls, etc. In FIG. 1, the FCC 142A-B are located in and/or otherwise proximate to the EE compartment 141. For example, the FCC 142A-B can be in the EE compartment 141 and/or, more generally, in front of the engines 108, 110. Alternatively, one or more of the FCC 142A-B may be located elsewhere in the aircraft 100.

In the illustrated example of FIG. 1, the aircraft 100 includes an example alternate power unit (APU) 144 to provide power (e.g., backup power) to actuators operatively coupled to one or more flight control surfaces when a pilot of the aircraft 100 assumes a backup control mode and/or an alternate control mode. In some examples, the APU 144 can be a gas turbine, a (relatively) small jet engine, etc. In some examples, the APU 144 includes batteries (e.g., redundant APU rechargeable batteries) used to power example wing actuators 242, 244 depicted in FIG. 2A using example power coupling connection(s) 245 depicted in FIG. 2A. The power coupling connection(s) can include one or more electrical cable bundles (e.g., an electrical cable bundle that includes one or more electrical cables, where each of the one or more electrical cables includes one or more electrical conductors). The power coupling connection(s) 245 may include additional components such as circuit breaker(s), relay(s), etc. Alternatively, the aircraft 100 may include more than one APU 144. In FIG. 1, the APU 144 is located in a rear portion or section (e.g., a tail cone) of the aircraft 100. For example, the APU 144 can be behind the wings 102, 104. Alternatively, the APU 144 may be located elsewhere in the aircraft 100.

FIG. 2A depicts an example aircraft roll operation control system 200 included in the aircraft 100 of FIG. 1. The aircraft roll operation control system 200 facilitates roll operations of the aircraft 100 by controlling the ailerons 120, 122 of FIG. 1, the spoilers 124A-D, 126A-D of FIG. 1, etc., and/or a combination thereof using a hybrid system. For example, the aircraft roll operation control system 200 can control the ailerons 120, 122 while the FCC 142A-B of FIG. 1 is operating in a mode. In some examples, the FCC 142A-B can operate and/or otherwise facilitate control of one or more flight control surfaces and/or, more generally, the aircraft 100 of FIG. 1, in an example autopilot control mode (e.g., a Category IIIA autopilot mode when the aircraft 100 is dispatched at Master Minimum Equipment List (MMEL 1) category, a Category IIIA autopilot mode when the aircraft 100 is dispatched at MMEL 2 category, or a Category 3B autopilot mode, etc.), an example normal control mode, or an alternate control mode. For example, the FCC 142A-B and/or, more generally, the aircraft roll operation control system 200, and/or, more generally, the aircraft 100, can operate in one of the autopilot control modes, the normal control mode, or the alternate control mode.

In some examples, when a jam (e.g., a system jam) occurs inside the cockpit 138 (e.g., a jam at or in connection with a control wheel), the aircraft roll operation control system 200 can control the spoilers 124A-D, 126A-D with one-half of the normal system gain while the SCE controller 140 of FIG. 1 is operating in an active state. In some examples, when a system jam occurs outside the cockpit 138, the FCC 142A-B, the SCE controller 140, and/or, more generally, the aircraft roll operation control system 200, and/or, more generally, the aircraft 100, can control the spoilers 124A-D, 126A-D with normal system gain.

In the illustrated example of FIG. 2A, the aircraft roll operation control system 200 includes components in the cockpit 138 of FIG. 1 to facilitate aircraft roll operations. In FIG. 2A, the cockpit 138 includes example control wheels 202, 204, example shafts 203A-B, 205A-B, example bus cables 206A-B including a first example bus cable 206A and a second example bus cable 206B, an example force sensor 208, an example jam override device 210, an example back-drive actuator 211, example control wheel position sensors 212, 214, and an example feel-and-centering (FAC) device 250.

In the illustrated example of FIG. 2A, the aircraft roll operation control system 200 includes the control wheels 202, 204 to translate an input from a pilot to control the flight control surfaces of FIG. 1. In FIG. 2A, the control wheels 202, 204 include a first example control wheel 202 having a first example shaft 203A and a second example shaft 203B and a second example control wheel 204 having a third example shaft 205A and a fourth example shaft 205B. In FIG. 2A, the first control wheel 202 is operatively coupled to the redundant bus cables 206A-B via the first shaft 203A and the second control wheel 204 is operatively coupled to the redundant bus cables 206A-B via the third shaft 205A. The third shaft 205A has a redundant load path and is inspectable. For example, in response to a pilot turning the first control wheel 202, the first shaft 203A can proportionally turn to control motion of the bus cables 206A-B.

Advantageously, by coupling the control wheels 202, 204 to the bus cables 206A-B, either input from the first control wheel 202 or the second control wheel 204 is sensed by the force sensor 208 and either input can control the FAC device 250. In FIG. 2A, the first shaft 203A and the second shaft 203B are concentric shafts. In FIG. 2A, the force sensor 208 has a redundant load path and is inspectable. The force sensor 208 couples the first shaft 203A to the second shaft 203B. The second shaft 203B has a redundant load path and is inspectable. In FIG. 2A, the third shaft 205A and the fourth shaft 205B are concentric shafts. In FIG. 2A, the jam override device 210 has a redundant load path and is inspectable. The jam override device 210 couples the third shaft 205A to the fourth shaft 205B. In FIG. 2A, any single failure in the cockpit 138 will not result in a degradation of system gain since each of the elements associated with the cockpit 138 has a redundant load path. Any latent failure in the redundant load path is eliminated because one or more of the components included in and/or otherwise associated with the cockpit 138 are inspected at regularly scheduled maintenance intervals.

In the illustrated example of FIG. 2A, the aircraft roll operation control system 200 includes the force sensor 208 to measure a force applied to and/or otherwise associated with the control wheels 202, 204. In FIG. 2A, the force sensor 208 is a force transducer. Alternatively, the force sensor 208 may be a torque sensor or other force sensing device. In FIG. 2A, the force sensor 208 can transmit force data, force measurements, etc., to the FCC 142A-B. The FCC 142A-B can record the force data, the force measurements, etc., in an example flight data recorder (FDR) 213 for pilot training and/or for data analysis of the aircraft 100. For example, the FDR 213 can be a computing device configured to record and/or otherwise store flight parameters or other data associated with the aircraft 100.

In the illustrated example of FIG. 2A, the aircraft roll operation control system 200 includes the jam override device 210 to isolate at least one of the first control wheel 202 or the second control wheel 204 in the event of a mechanical control jam in the cockpit 138. For example, a mechanical control jam of the second shaft 203B can correspond to an unintended, non-responsive, and/or otherwise not desired operation of one or more mechanical components of the aircraft roll operation control system 200. For example, the mechanical control jam of the second shaft 203B can result from non-responsive operation from the first control wheel position sensor 212 and/or the FAC device 250. In such examples, an additional pilot input force from the second control wheel 204 is transmitted to the jam override device 210, which isolates the fourth shaft 205B from the third shaft 205A and a position of the second control wheel position sensor 214 follows a position of the second control wheel 204. In FIG. 2A, the jam override device 210 has a pre-loaded spring that the pre-load allows or facilitates normal system operation. When a jam occurs in an area designated by the cockpit 138, one of the control wheels 202, 204 can be jammed. The override feature is activated when applying a pilot input force great than the pre-load to the non-jammed one of the control wheels 202, 204. Such pilot action allows isolation of the jammed portion of the aircraft roll operation control system 200, and allows continued pilot control of the non-jammed portion of the aircraft roll operation control system 200. Advantageously, by coupling the control wheels 202, 204 to the bus cables 206A-B, the jam override device 210 can provide control for one of the two control wheels 202, 204 while the other control wheel is immobilized.

In the illustrated example of FIG. 2A, the aircraft roll operation control system 200 includes the back-drive actuator 211 to cause a displacement of the control wheels 202, 204 during autopilot control. In some examples, the FCC 142A-B and/or the SCE controller 140 operating in autopilot can generate command(s) to actuate the back-drive actuator 211, which can cause a displacement of the control wheel(s). The back-drive actuator 211 can back-drive the control wheels 202, 204 to provide physical and/or visual feedback to the pilot corresponding to the autopilot system being in control of the aircraft.

In the illustrated example of FIG. 2A, the aircraft roll operation control system 200 includes the redundant control wheel position sensors 212, 214 to measure a position of the control wheels 202, 204. In FIG. 2A, the control wheel position sensors 212, 214 include a first example control wheel position sensor 212 and a second example control wheel position sensor 214. In FIG. 2A, the first control wheel position sensor 212 is coupled to the second shaft 203B of the first control wheel 202. In FIG. 2A, the second control wheel position sensor 214 is coupled to the third shaft 205A of the second control wheel 204. For example, the control wheel position sensors 212, 214 can measure an angle of rotation, a position difference with respect to an origin or other reference angle, etc., of the control wheels 202, 204. In FIG. 2A, the control wheel position sensors 212, 214 may be implemented using linear or rotary variable displacement transformer sensors. Alternatively, one or both control wheel position sensors 212, 214 may be resolvers, potentiometers, or other position sensing devices.

In the illustrated example of FIG. 2A, the aircraft roll operation control system 200 includes the FAC device 250 to provide rising control forces to the pilot as a deterrent to excessive maneuvering of the aircraft 100. For example, the FAC device 250 can prevent the control wheels 202, 204 from drifting away from a centered or otherwise pre-defined position when the control wheels 202, 204 are not desired or meant to be rotated. In FIG. 2A, the FAC device 250 is operatively coupled to the control wheels 202, 204 via the second shaft 203B, the force sensor 208, the first shaft 203A, the bus cables 206A-B, the fourth shaft 205B, and the third shaft 205A.

In the illustrated example of FIG. 2A, the aircraft roll operation control system 200 includes the SCE controller 140 to obtain control wheel position sensor data from the control wheel position sensors 212, 214 and/or control one or more of the aircraft flight control surfaces of FIG. 1. In FIG. 2A, the SCE controller 140 is coupled to the second control wheel position sensor 214. In FIG. 2A, the SCE controller 140 obtains control wheel position data measured by the first control wheel position sensor 212 from the FCC 142A-B via example data bus(es) 216. In FIG. 2A, the SCE controller 140 is coupled to example spoiler actuators 226A-D, 228A-D, the FCC 142A-B, and an example electric actuator 238. For example, the SCE controller 140 can generate flight commands based on the obtained control wheel position sensor data to control one or more of the spoiler actuators 226A-D, 228A-D and/or the electric actuator 238.

In some examples, the SCE controller 140 and the FCC 142A-B communicate via two separate ones of the data buses 216. Each of the two data buses 216 provides a communication medium or interface between (1) the SCE controller 140 and (2) one of the FCCs 142A-B to transfer control wheel position sensor data and/or other data (e.g., force sensing data from the force sensor 208, control wheel position data from the control wheel position sensors 212, 214, flight commands, etc., and/or a combination thereof). Based on data obtained from the FCC 142A-B via the one(s) of the data buses 216, the SCE controller 140 can determine flight commands for actuators of interest for controlling the flight control surfaces of the aircraft 100. In some examples, the FCC 142A-B transmits flight commands from the FCC 142A-B to the SCE controller 140 to control the spoiler actuators 226A-D, 228A-D. For example, in response to the SCE controller 140 obtaining the flight commands from the FCC 142A-B, the SCE controller 140 can control one(s) of the spoiler actuators 226-D, 228A-D based on the obtained flight commands.

The data bus(es) 216 of FIG. 2A is/are bus(es) and/or computer network(s). For example, the data bus(es) 216 can be internal controller bus(es), aircraft control network(s), etc. For example, the aircraft control network(s) can utilize one or more communication protocols based on Aeronautical Radio, Incorporated (ARINC) specifications (e.g., ARINC 425, ARINC 629, ARINC 664, ARINC 1553, etc.). The data bus(es) 216 of FIG. 2A can be implemented using any suitable wired and/or wireless network(s) including, for example, one or more data buses, one or more Local Area Networks (LANs), one or more wireless LANs (WLANs), one or more fiber optic networks, etc.

In the illustrated example of FIG. 2A, the aircraft roll operation control system 200 includes the FCC 142A-B to obtain control wheel position data and/or control the flight control surfaces of FIG. 1. In FIG. 2A, the FCC 142A-B is coupled to the SCE controller 140, the force sensor 208, example multi-mode (MM) actuators 236A, 236B. For example, the FCC 142A-B can generate flight commands based on control wheel position sensor data to control the MM actuators 236A, 236B. In such examples, the FCC 142A-B can generate flight commands based on the control wheel position. In some such examples, the flight commands can include, correspond to, and/or otherwise be representative of one or more analog control signals (e.g., a current, a voltage, etc.) that, when transmitted to an actuator, a flight control surface, etc., the actuator, the flight control surface, etc., can be actuated to move in angle, position, etc., and/or a combination thereof. In some examples, the FCC 142A-B can generate autopilot flight commands based on aircraft parameters associated with the aircraft 100 to control the MM actuators 236A, 236B and the spoiler actuators 226A-D, 228A-D.

In the illustrated example of FIG. 2A, the aircraft roll operation control system 200 includes a first example hydraulic system (HYD A) 218 and a second example hydraulic system (HYD B) 220 to provide flow of hydraulic fluid at pressure to actuators throughout the aircraft roll operation control system 200. In FIG. 2A, the hydraulic systems 218, 220 are coupled to the spoiler actuators 226A-D, 228A-D, the MM actuators 236A, 236B, example pressure sensors 222, 224, and example aileron actuators 230, 232. While the hydraulic systems 218, 220 are shown as single components in the illustrated example of FIG. 2A, the hydraulic systems 218, 220 can be implemented by any number and/or type of components, sub-systems, etc., such as hydraulic pumps, reservoirs, accumulators, heat exchangers, filters, etc.

The aircraft roll operation control system 200 of the example of FIG. 2A includes the pressure sensors 222, 224 to measure, sense, and/or otherwise determine pressure (e.g., hydraulic pressure) at different locations, positions, etc., of and/or within the hydraulic systems 218, 220. In FIG. 2A, the pressure sensors 222, 224 include a first example pressure sensor 222 and a second example pressure sensor 224. In FIG. 2A, the first pressure sensor 222 measures a first pressure associated with the first hydraulic system 218. In FIG. 2A, the second pressure sensor 224 measures a second pressure associated with the second hydraulic system 220. In FIG. 2A, the pressure sensors 222, 224 are piezoresistive strain gauges. Alternatively, one or both pressure sensors 222, 224 may be electromagnetic pressure sensors or other pressure sensing devices.

In the illustrated example of FIG. 2A, the aircraft roll operation control system 200 includes first example spoiler actuators 226A-D and second example spoiler actuators 228A-D to control the actuation of the spoilers 124A-D, 126A-D of FIG. 1. In FIG. 2A, the spoiler actuators 226A-D, 228A-D are coupled to the spoilers 124A-D, 126A-D, the SCE controller 140, and at least one of the hydraulic systems 218, 220. The spoiler actuators 226A-D, 228A-D are coupled (e.g., communicatively coupled, electrically coupled, etc.) to the SCE controller 140 to facilitate the transmission of flight commands from the SCE controller 140 to the spoiler actuators 226A-D, 228A-D.

In the illustrated example of FIG. 2A, the first spoiler actuators 226A-D are coupled to the first hydraulic system 218. In FIG. 2A, the first spoiler actuators 226A-D include a first example spoiler actuator 226A, a second example spoiler actuator 226B, a third example spoiler actuator 226C, and a fourth example spoiler actuator 226D. In FIG. 2A, the first spoiler actuator 226A controls the second spoiler 126B of the second wing 104 of FIG. 1, the second spoiler actuator 226B controls the fourth spoiler 126D of the second wing 104, the third spoiler actuator 226C controls the second spoiler 124B of the first wing 102, and the fourth spoiler actuator 226D controls the fourth spoiler 124D of the first wing 102.

In the illustrated example of FIG. 2A, the second spoiler actuators 228A-D are coupled to the second hydraulic system 220. In FIG. 2A, the second spoiler actuators 228A-D include a fifth example spoiler actuator 228A, a sixth example spoiler actuator 228B, a seventh example spoiler actuator 228C, and an eighth example spoiler actuator 228D. In FIG. 2A, the fifth spoiler actuator 228A controls the first spoiler 124A of the first wing 102, the sixth spoiler actuator 228B controls the third spoiler 124C of the first wing 102, the seventh spoiler actuator 228C controls the first spoiler 126A of the second wing 104, and the eighth spoiler actuator 228D controls the third spoiler 126C of the second wing 104.

The hydraulic systems 218, 220 deliver, provide, and/or otherwise transmit hydraulic fluid at pressure to the spoiler actuators 226A-D, 228A-D to control the spoilers 124A-D, 126A-D. In FIG. 2A, the spoiler actuators 226A-D, 228A-D are hydraulic cylinder actuators. Alternatively, one or both spoiler actuators 226A-D, 228A-D may be hydraulic motors or hydraulic rotary actuators.

In the illustrated example of FIG. 2A, the aircraft roll operation control system 200 includes a first example MM actuator 236A and a second example MM actuator 236B to control the actuation of the aileron actuators 230, 232. For example, the MM actuators 236A-B can control one(s) of the aileron actuators 230, 232 in different modes, such as in the autopilot mode, the manual mode, etc. The MM actuators 236A, 236B are coupled (e.g., communicatively coupled, electrically coupled, etc.) to the FCC 142A-B to facilitate the transmission of flight commands from the FCC 142A-B to the MM actuators 236A, 236B. The first MM actuator 236A is coupled to the first hydraulic system 218 and the second MM actuator 236B is coupled to the second hydraulic system 220. The hydraulic systems 218, 220 transmit hydraulic fluid at pressure to the MM actuators 236A, 236B to control the aileron actuators 230, 232. The first MM actuator 236A is hydraulically and/or otherwise operatively coupled to the first example aileron actuator 230 and the second MM actuator 236B is hydraulically and/or operatively coupled to the second example aileron actuator 232. In FIG. 2A, the MM actuators 236A, 236B are hydraulic cylinder actuators. Alternatively, one or both MM actuators 236A, 236B may be hydraulic motors, hydraulic rotary actuators, or any other type of actuator.

The example aircraft roll operation control system 200 of FIG. 2A includes the electric actuator 238 to actuate the aileron actuators 230, 232 in response to one of the two hydraulic systems being non-responsive or not available. The electric actuator 238 is powered by an example aircraft electrical system (AES) 215. The electric actuator 238 is controlled by the SCE controller 140 based on the control wheel position of one(s) of the control wheels 202, 204.

In some examples, during a first Power-Up Built-in Test (PBIT), the electric actuator 238 is operatively coupled to the aileron actuators 230, 232 to control the aileron actuators 230, 232, which, in turn, control the ailerons 120, 122. In some examples, during a second PBIT test, the analog path (e.g., an example analog circuit 240) of the FCC 142A-B commands the wing actuators 242, 244, which are powered by the APU 144. During the second PBIT test, both hydraulic systems 218, 220 are depressurized (e.g., the aileron actuators 230, 232 are in block mode). The two PBIT tests are performed when the aircraft 100 is in a parked position on a ground surface (e.g., not in flight). In FIG. 2A, the electric actuator 238 is a linear reversing and/or bidirectional motor (e.g., a geared motor) but could alternatively be a unidirectional motor, a rotary motor, or any other type of actuator.

In the illustrated example of FIG. 2A, the aircraft roll operation control system 200 includes the APU 144 to provide power to the wing actuators 242, 244. The aircraft electrical system 215 is coupled (e.g., communicatively coupled, electrically coupled, etc.) to the SCE controller 140 (not shown) and the electric actuator 238. The aircraft electrical system 215 also delivers power to the FCC 142A-B (not shown). The FCC 142A-B can control the state of the APU 144 and the state of one or more solenoid valves in the aileron actuators 230, 232 via the analog circuit 240.

The aircraft roll operation control system 200 of example FIG. 2A includes the analog circuit 240 to provide control signals (e.g., analog control signals corresponding to a current and/or a voltage) between the control wheel position sensors 212, 214 and the wing actuators 242, 244 via the FCC 142A-B. In FIG. 2A, the analog circuit 240 couples the FCC 142A-B to the wing actuators 242, 244 (e.g., a direct control path, a direct analog control path, etc.) to control the wing actuators 242, 244 based on measurements from the control wheel position sensors 212, 214.

In some examples, the analog circuit 240 enables the FCC 142A-B to invoke the wing actuators 242, 244 to control the ailerons 120, 122. In FIG. 2A, the wing actuators 242, 244 include a first example wing actuator 242 coupled (e.g., operatively coupled) to the first differential linkage 246 to control the first aileron 120. In FIG. 2A, the wing actuators 242, 244 include a second example wing actuator 244 coupled (e.g., operatively coupled) to the second differential linkage 248 to control the second aileron 122.

In some examples, the analog circuit 240 enables the transmission of analog signals from the control wheel position sensors 212, 214 to the wing actuators 242, 244 via the FCC 142A-B to actuate the wing actuators 242, 244 based on the control wheel position of one(s) of the control wheels 202, 204. Advantageously, the power couplings 245 can transmit power from one or more example batteries (BATT) 145 (e.g., rechargeable batteries) of the APU 144 to the wing actuators 242, 244 to control the ailerons 120, 122. For example, the batteries 145 of the APU 144 can be rechargeable lithium-ion batteries, but could alternatively be any other type of battery.

In some examples, (1) solenoid valve(s) in both aileron actuators 230, 232 are de-energized (e.g., the solenoid valve(s) is/are turned off and/or otherwise disabled) as described below in connection with FIG. 6B and (2) the APU 144 is invoked to power the wing actuators 242, 244 when both (3) hydraulic systems 218, 220 do not have the proper fluid pressure to operate or (4) a generic or common mode failure that affects all digital channels in the FCC 142A-B and SCE controller 140 substantially simultaneously or (5) a jam exists outside of cockpit control and/or otherwise is external to the cockpit 138.

The example aircraft roll operation control system 200 of FIG. 2A includes the first aileron actuator 230 and the second aileron actuator 232 to interact with an example wing cable system 234 to control the aircraft ailerons 120, 122. In FIG. 2A, the FCC 142A-B is coupled to the aileron actuators 230, 232. For example, one(s) of the FCC 142A-B can control one(s) of the aileron actuators 230, 232 based on flight command(s), flight parameter(s), etc. In FIG. 2A, the first aileron actuator 230 is coupled to the first hydraulic system 218 and the second aileron actuator 232 is coupled to the second hydraulic system 220. The hydraulic systems 218, 220 transmit hydraulic fluid at pressure to the aileron actuators 230, 232 to control the aircraft ailerons 120, 122.

In the illustrated example of FIG. 2A, the aileron actuators 230, 232 are operatively coupled to the wing cable system 234 via an example cable quadrant 252. In FIG. 2A, in response to the cable quadrant 252 rotating clockwise, the wing cable system 234 is configured to move according to a first arrow 234A and a second arrow 234B. In FIG. 2A, in response to the cable quadrant 252 rotating counter-clockwise, the wing cable system 234 is configured to move opposite the first arrow 234A and the second arrow 234B. In FIG. 2A, the aileron actuators 230, 232 are hydraulic linear actuators. Alternatively, one or both aileron actuators 230, 232 may be hydraulic rotary actuators, hydraulic motors, or any other type of actuator.

In the illustrated example of FIG. 2A, the aircraft roll operation control system 200 includes a plurality of example pulleys 254 that are coupled to the wing cable system 234 in a plurality of locations to allow the wing cable system 234 to be routed throughout the aircraft 100 while maintaining the ability to translate freely as the pulleys 254 rotate. While FIG. 2A only depicts eight of the pulleys 254, fewer or more pulleys than depicted in FIG. 2A can be used.

The example aircraft roll operation control system 200 of FIG. 2A includes the wing cable system 234 to transfer translational and/or rotational energy from the aileron actuators 230, 232 to example differential linkages 246, 248 that are coupled to the ailerons 120, 122 and the wing actuators 242, 244. In FIG. 2A, the differential linkages 246, 248 include a first example differential linkage 246 coupled to the first aileron 120 of FIG. 1 and a second example differential linkage 248 coupled to the second aileron 122 of FIG. 1. The wing cable system 234 effectuates the aileron actuators 230, 232 to control both ailerons 120, 122 with one actuation. In FIG. 2A, the wing cable system 234 includes one or more cables (e.g., flexible carbon steel cables) that can include, correspond to, and/or otherwise be representative of a plurality of different fittings, turnbuckles, linkages, etc., and/or a combination thereof to connect and/or otherwise couple to other components to facilitate cable adjustments or changes in cable position.

In the illustrated example of FIG. 2A, the aircraft roll operation control system 200 includes the first differential linkage 246 and the second differential linkage 248 to convert and/or otherwise transfer translational movement from the wing cable system 234 into rotational movement of the differential linkages 246, 248 to control an angle of respective ones of the ailerons 120, 122. For example, the first differential linkage 246 can adjust a first angle of the first aileron 120 to a second angle different from the first angle. In other examples, the second differential linkage 248 can adjust a first angle of the second aileron 122 to a second angle different from the first angle.

In the illustrated example of FIG. 2A, the differential linkages 246, 248 are mechanical linkages that enable the conversion and transfer of energy from the wing actuators 242, 244 to the ailerons 120, 122. In FIG. 2A, the aircraft roll operation control system 200 includes example aileron position sensors (APS) 247, 249. The APS 247, 249 measure and/or otherwise determine a position of the ailerons 120, 122 based on actuation and/or a position of the wing actuator 242, 244. In FIG. 2A, the first APS 247 measures and/or otherwise determines a position of the first aileron 120. In FIG. 2A, the second APS 249 measures and/or otherwise determines a position of the second aileron 122. For example, the APS 247, 249 can be coupled (e.g., operatively coupled) to the ailerons 120, 122 to determine a position of the ailerons 120, 122.

In FIG. 2A, the APS 247, 249 are coupled (e.g., communicatively coupled, electrically coupled, etc.) to the FCC 142A-B. For example, the APS 247, 249 can transmit aileron position data, aileron position measurements, etc., of a corresponding aileron 120, 122 to the FCC 142A-B. In such examples, the FCC 142A-B can control the ailerons 120, 122 in the alternate mode based on the aileron position data from the APS 247, 249.

In some examples, the SCE controller 140 and/or the FCC 142A-B determine that a mechanical control jam exists outside of or external to the cockpit 138. The SCE controller 140 and/or the FCC 142A-B can execute such a determination by comparing aileron position data from the aileron position sensors 247, 249 obtained from the FDR 213 and control wheel position data obtained from the control wheel position sensors 212, 214. In such examples, the aircraft roll operation control system 200 can only control all of the spoilers 124A-D, 126A-D.

The first differential linkage 246 is coupled (e.g., operatively coupled) to the wing cable system 234, the first wing actuator 242, and the first aileron 120. The second differential linkage 248 is coupled (e.g., operatively coupled) to the wing cable system 234, the second wing actuator 244, and the second aileron 122. Additional detail in connection with the differential linkages 246, 248 is described below in reference with FIGS. 7A, 7B, and 7C.

In the illustrated example of FIG. 2A, the aircraft roll operation control system 200 includes the first wing actuator 242 and the second wing actuator 244 to control the differential linkages 246, 248 to move the ailerons 120, 122. In FIG. 2A, the wing actuators 242, 244 are linear reversing and/or bidirectional motors (e.g., a geared motor). Alternatively, one or both wing actuators 242, 244 may be a unidirectional motor, a rotary motor, or any other type of electrical actuator. In the example of FIG. 2A, the wing actuators 242, 244 are coupled (e.g., communicatively coupled, electrically coupled, etc.) to the FCC 142A-B via the analog circuit coupling 240. For example, the FCC 142A-B can transmit analog command signals to the wing actuators 242, 244 and obtain analog actuator feedback signals from the APS 247, 249 via the analog circuit coupling 240.

The aircraft roll operation control system 200 of the illustrated example of FIG. 2A includes a plurality of line weights and line types that correspond to locational references and/or types of couplings between objects and/or parts within the system. In FIG. 2A, an example aircraft roll operation control system legend 256 depicts a line weight and line type that corresponds to the locational reference or type of coupling depicted in the illustrated example of FIG. 2A. For example, the analog circuit coupling(s) 240 can correspond to a communication data bus, an electrical power connection, etc., and/or a combination thereof.

In the example of FIG. 2A, the aircraft roll operation control system 200 implements the aileron actuators 230, 232, the wing actuators 242, 244, the differential linkages 246, 248, the analog circuit coupling 240, an example main control valve (MCV) 502, an example mode selector valve (MSV) 504, and an example solenoid valve 506 described in connection with FIGS. 5A-6B to provide control of the ailerons 120, 122 in the event of a dual hydraulic system 218, 220 malfunction or in the event of a digital computing malfunction. The MSV 504 can control fluid flow through and/or, more generally, within the actuator 500.

In some examples, the analog circuit 240 effectuates an electrical connection and/or otherwise couples (e.g., communicatively couples, electrically couples, etc.) the control wheel position sensors 212, 214 and the wing actuators 242, 244 to the FCC 142A-B and, thus, allows the wing actuators 242, 244 to control the ailerons 120, 122 without the use of the hydraulic systems 218, 220. In such examples, the control wheel position sensors 212, 214 can transmit analog signals, based on the control wheel position, to the FCC 142A-B. In response to obtaining the analog signals, the FCC 142A-B can transmit, or, in some examples, relay the analog signals to the wing actuators 242, 244 using the analog circuit coupling 240. In some examples, the batteries 145 and/or, more generally, the APU 144, can power the wing actuators 242, 244 in the event of a digital computing malfunction, as well as, in the event of a dual hydraulic malfunction.

In some examples, in the event of a single hydraulic system malfunction (e.g., the first hydraulic system 218 or the second hydraulic system 220) as further described in FIGS. 5A-6A, the MSV 504 is automatically switched (e.g., passively switched) from a first position (e.g., an active position) into a second position (e.g., a bypass position). Advantageously, by switching to the second position, the aircraft roll operation control system 200 can enable continued control of the ailerons 120, 122 by operation of one of the aileron actuators 230, 232. Advantageously, by switching to the second position (e.g., the bypass position), the aircraft roll operation control system 200 allows operation of one of the aileron actuators 230, 232 in active mode while the other one of aileron actuators 230, 232 is in bypass mode.

Figure 5A:
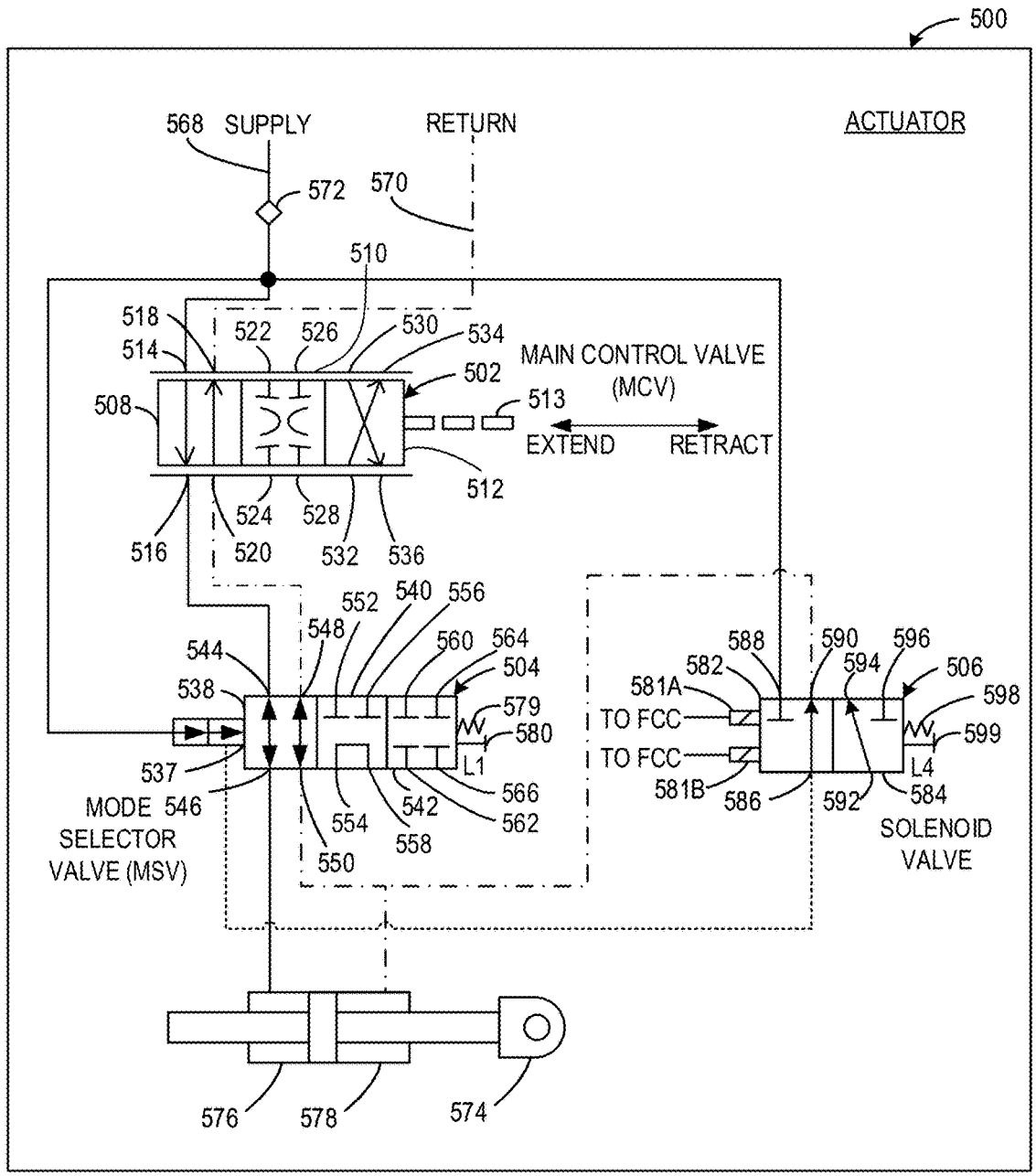
FIG. 5A depicts an example implementation of an aileron actuator in a first active position to control example ailerons of the example aircraft of FIG. 1
Figure 5B:
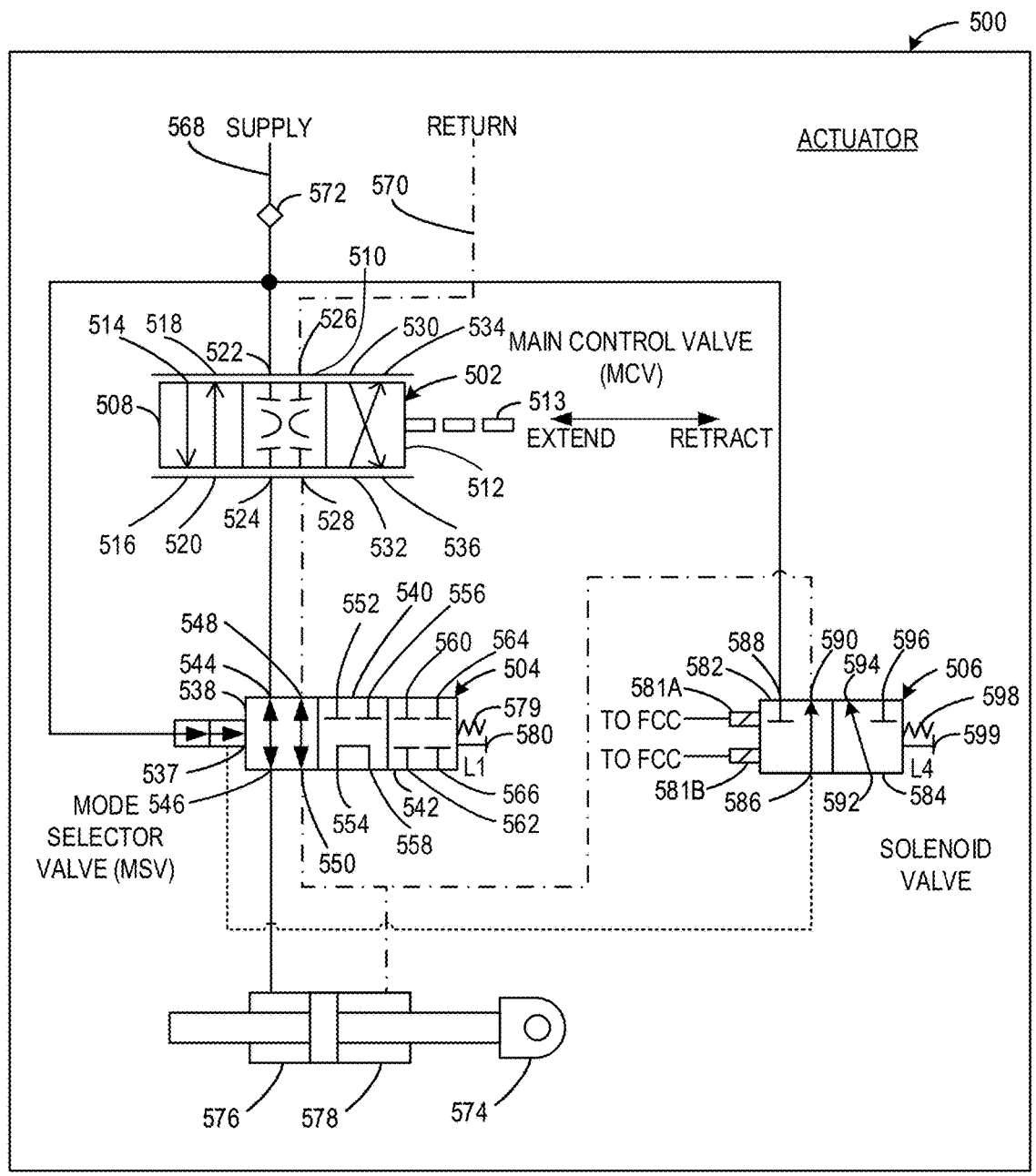
FIG. 5B depicts the aileron actuator of FIG. 5A in a neutral position.
Figure 5C:
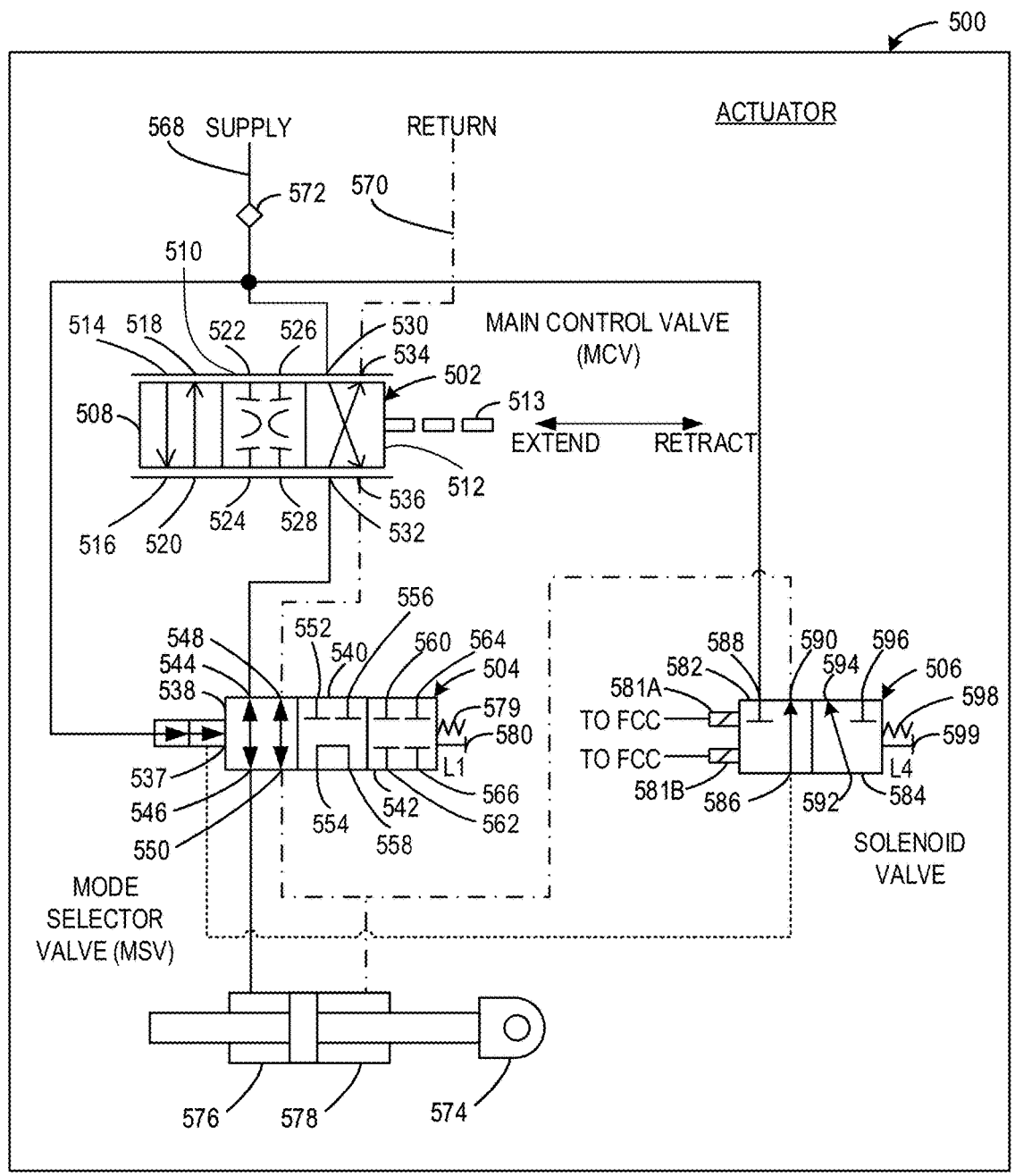
FIG. 5C depicts the aileron actuator of FIG. 5A in a second active position.
Figure 6A:
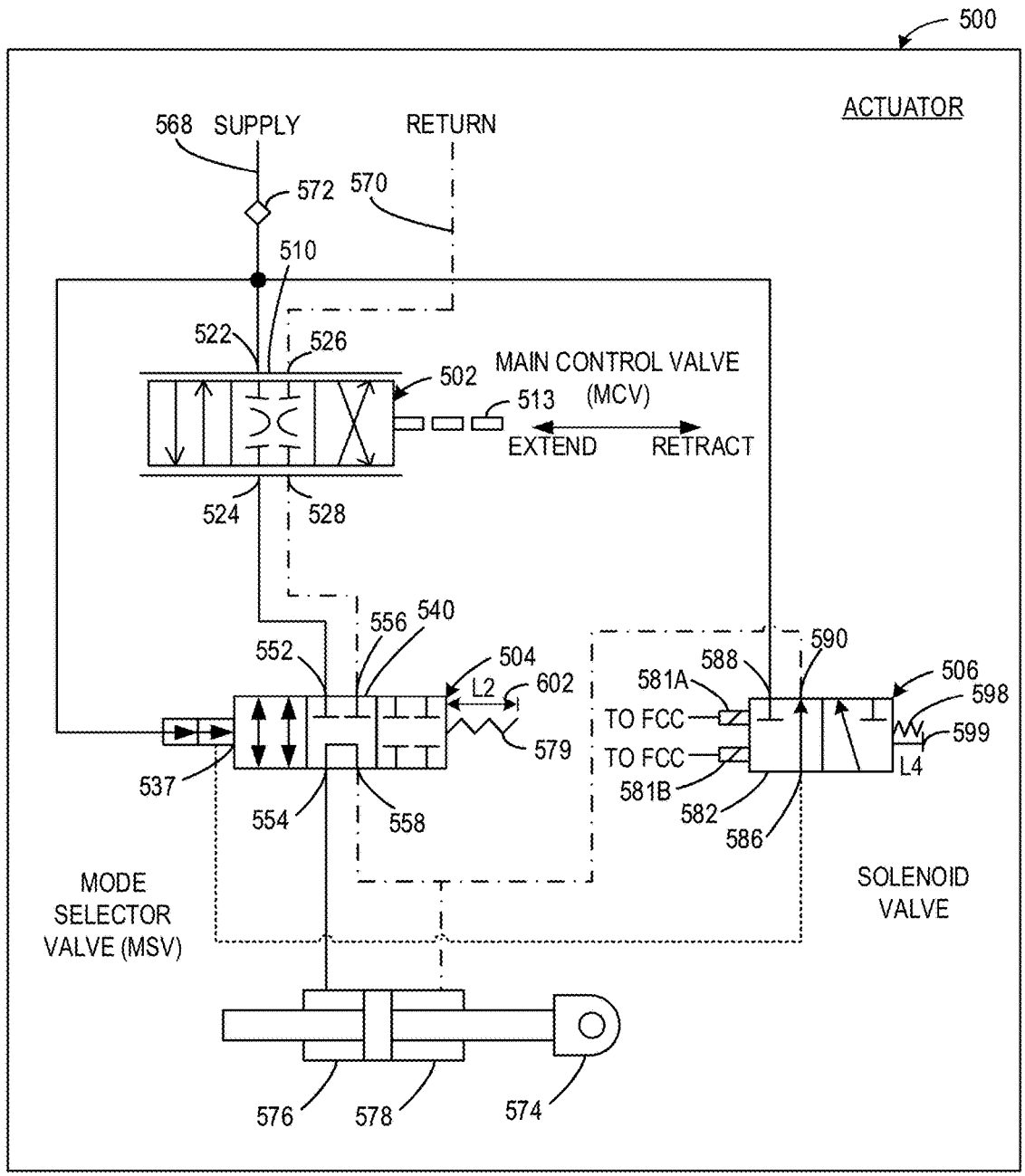
FIG. 6A depicts the example implementation of the aileron actuator of FIGS. 5A-5C in a bypass position.
Figure 6B:
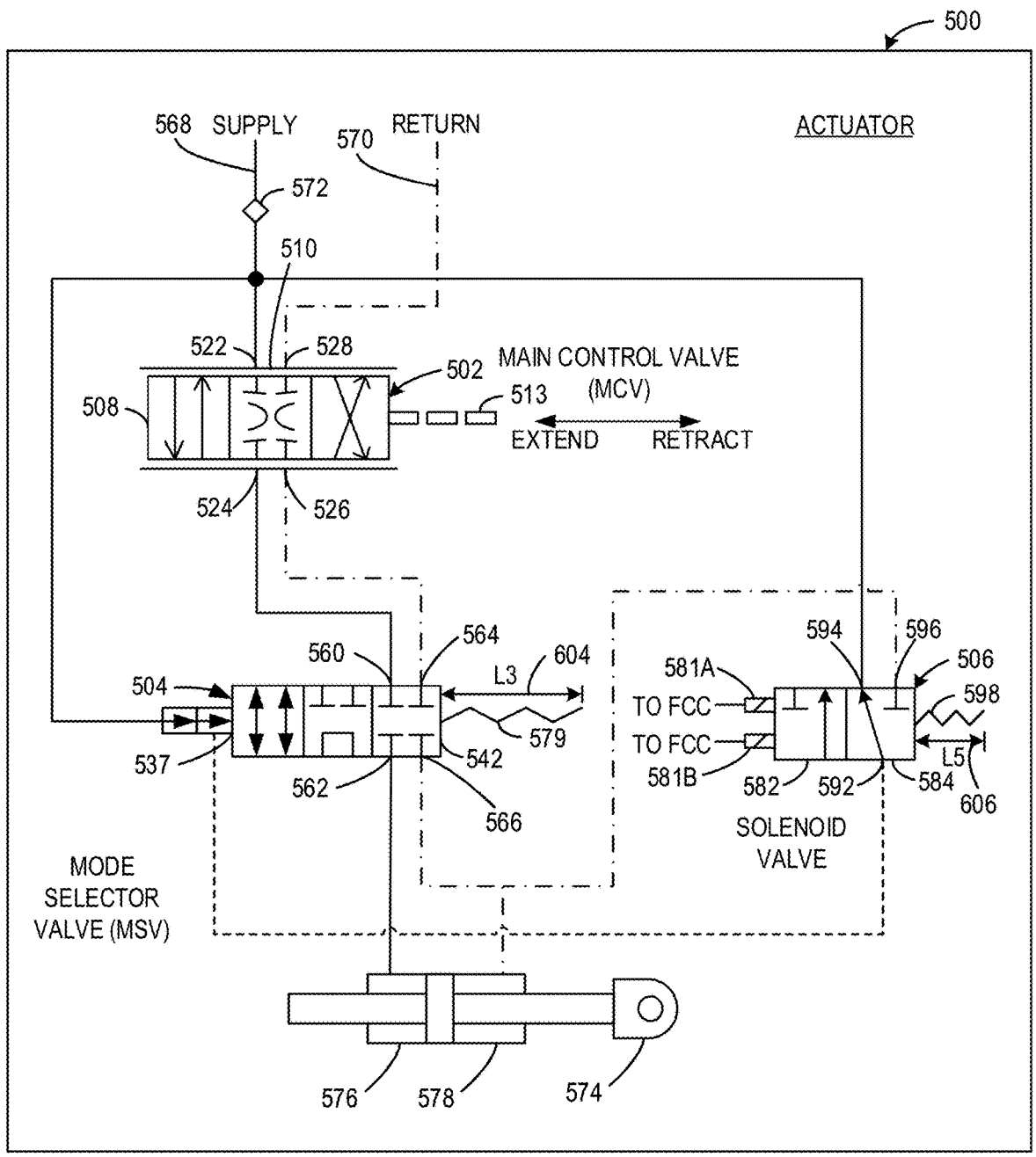
FIG. 6B depicts the example implementation of the aileron actuator of FIGS. 5A-5C in a block position.

In some examples, in the event of a dual hydraulic system malfunction (e.g., both the first and second hydraulic systems 218, 220 malfunction or are non-responsive), the solenoid valve 506 of each of the aileron actuators 230, 232, as further described in connection with FIG. 6B, are de-energized to switch the aileron actuators 230, 232 from the second position (e.g., the bypass position) into a third position (e.g., a block position). In such examples, in response to the aileron actuators 230, 232, being switched or adjusted into the third position, the aileron actuators 230, 232 can prevent the wing cable system 234 from moving and, thus, allowing the wing actuators 242, 244 to control the ailerons 120, 122. For instance, without switching the aileron actuators 230, 232 into the third position, the wing cable system 234 can still have the ability to move and could hinder the actuation of the wing actuators 242, 244. Further description of switching the aileron actuators 230, 232 to an active position, a bypass position, or a block position is described below in connection with FIGS. 5A-6B.

FIG. 2B depicts an example control loop 260 to implement the aircraft roll operation control system 200 of FIG. 2A. The example control loop 260 of FIG. 2B includes example control wheel position data 262, an example wing actuator command 264, an example difference determiner 266, an example wing actuator motor command 268, an example wing actuator motor 270, an example aileron 272, and example aileron position data 274.

In the example of FIG. 2B, the control wheel position data 262 can be generated by one(s) of the control wheels 202, 204 of FIG. 2A. For example, the control wheel position data 262 can include a first control wheel position of the first control wheel 202, a second control wheel position of the second control wheel 204, etc. In the example of FIG. 2B, the wing actuator command 264 can be generated and/or otherwise determined by the FCC 142A-B of FIG. 2B. In the example of FIG. 2B, the difference determiner 266 can be implemented by hardware, software, firmware, and/or any combination of hardware, software, and/or firmware. For example, the difference determiner 266 can be implemented by the FCC 142A-B of FIGS. 1-2A. In the example of FIG. 2B, the wing actuator motor command 268 can be generated and/or otherwise determined by the FCC 142A-B based on a difference between the wing actuator command 264 and the aileron position data 274 (e.g., a position of the aileron 272).

In the example of FIG. 2B, the wing actuator motor 270 can be implemented by one(s) of the wing actuator(s) 242, 244 of FIG. 2B and/or can be included in one(s) of the wing actuator(s) 242, 244 of FIG. 2B. For example, the wing actuator motor 270 can be a linear reversing and/or bidirectional motor (e.g., a geared motor). Alternatively, the wing actuator motor 270 may be a unidirectional motor, a rotary motor, or any other type of electrical actuator. In the example of FIG. 2B, the aileron 272 can be implemented by and/or otherwise correspond to one(s) of the aileron(s) 120, 122 of FIGS. 1-2A. In the example of FIG. 2B, the aileron position data 274 can be generated by one(s) of the APS 247, 249 of FIG. 2A.

In example operation, the FCC 142A-B can determine the wing actuator command 264 based on the control wheel position data 262. The FCC 142A-B can determine a difference between the wing actuator command 264 and the aileron position data 274. Based on the difference, the FCC 142A-B can generate the wing actuator motor command 268. The FCC 142A-B can transmit the wing actuator motor command 268 to adjust operation of the wing actuator motor 270 (e.g., the wing actuator motor 270 of one(s) of the wing actuator(s) 242, 244) by increasing a speed (e.g., a rotational speed), reducing the speed, etc., of the wing actuator motor 270. In response to adjusting the operation of the wing actuator motor 270, the aileron 272 moves from a first position to a second position, a first angle to a second angle, etc., and/or a combination thereof. In response to the aileron 272 being adjusted and/or otherwise moved, the aileron position data 274 is generated and transmitted to the FCC 142A-B to implement closed-loop control of the aircraft roll operation control system 200 of FIG. 2A.

FIG. 2C depicts a table 280 of example manual flight control modes and example states of components included in the aircraft roll operation control system 200 of FIG. 2A. The table 280 of FIG. 2C depicts the respective states of the various electronics (e.g., the SCE controller 140, the FCC 142A-B) and actuators illustrated in FIG. 2A, which are selectively invoked to enter or exit different manual flight control modes, such as normal control modes, alternate control modes, or manual flight control modes when a jam condition is present. FIG. 2C also depicts respective states of the aircraft roll control surfaces, such as the ailerons 120, 122 of FIGS. 1-2A, the spoilers 124A-D, 126A-D of FIGS. 1-2A, etc.

In the illustrated example of FIG. 2C, the table 280 includes example manual flight control modes including normal, normal with the first hydraulic system 218 of FIG. 2A being off (e.g., turned off, inactive, non-responsive, etc.), normal with the second hydraulic system 220 of FIG. 2A being off, alternate with both hydraulic systems 218, 220 being off, alternate with a generic fault, a jam included in the cockpit 138 of FIGS. 1-2A, and a jam external to the cockpit 138 of FIGS. 1-2A. In FIG. 2C, the FCC 142A-B and the SCE controller 140 are active when in the manual flight control modes.

In the normal manual flight control mode with the hydraulic systems 218, 220 being active, the MM actuators 236A-B are active while the electric actuator 238 is off. Accordingly, the aileron actuators 230, 232 are active while the wing actuators 242, 244 are off as the ailerons 120, 122 and the spoilers 124A-D are active and fully active, respectively.

In the normal manual flight control mode when the first hydraulic system 218 is off, the first MM actuator 236A is off and the electric actuator 238 is active. In response to the first hydraulic system 218 being off, the second aileron actuator 232 is automatically invoked to bypass mode and the spoilers 124A-D, 126A-D are partially active because the first spoiler 124A and the third spoiler 124C operatively coupled to the first wing 102 and the second spoiler 126B and the fourth spoiler 126D operatively coupled to the second wing 104 are off as they are controlled by the first hydraulic system 218, which is off.

In the normal manual flight control mode when the second hydraulic system 220 is off, the second MM actuator 236B is off and the electric actuator 238 is active. In response to the second hydraulic system 220 being off, the first aileron actuator 230 is automatically invoked to bypass mode and the spoilers 124A-D, 126A-D are partially active because the second spoiler 124B and the fourth spoiler 124D operatively coupled to the first wing 102 and the first spoiler 126A and the third spoiler 126C operatively coupled to the second wing 104 are off as they are controlled by the second hydraulic system 220, which is off.

In the alternate manual flight control mode, when either both hydraulic systems 218, 220 are off or a generic fault (e.g., a common mode failure affecting digital channels of the FCC 142A-B, the SCE controller 140, etc., and/or a combination thereof), the MM actuators 236A, 236B and the electric actuator 238 are off. In this mode, the FCC 142A-B and/or the SCE controller 140 read the position(s) of the control wheel position sensors 212, 214 and de-energize solenoid(s) included in the aileron actuators 230, 232, which invoke the aileron actuators 230, 232 to block mode. The FCC 142A-B also sends commands to the wing actuators 242, 244 to control the wing actuators 242, 244 based on the read position(s) as described above in connection with FIG. 2B. In this mode, the ailerons 120, 122 are active while the spoilers 124A-D, 126A-D are off due to loss of both hydraulic systems 218, 220. Advantageously, the aircraft roll operation control system 200 can mitigate, reduce, and/or otherwise prevent an effect of generic error or common mode failure when flight control surfaces, such as the ailerons 120, 122 of FIGS. 1-2A, are controlled by the wing actuators 242, 244 when the aircraft roll operation control system 200 and/or, more generally, the aircraft 100, is being controlled in the alternate control mode.

In the manual flight control mode where there is a jam inside the cockpit 138, the pilot(s) can make control inputs to the non-jammed control wheel to override the jam override device 210 of FIG. 2A, which controls the spoilers 124A-D, 126A-D with one-half of the system gain. For example, the control loop 260 of FIG. 2B can be used to effectuate control when in the manual flight control mode where there is a jam inside the cockpit 138. In the manual flight control mode where there is a jam external to the cockpit 138, the MM actuators 236A-B and the electric actuator 238 are invoked to turn off. Also, the FCC 142A-B can invoke the aileron actuators 230, 232 to block mode to maintain the last commanded position of the ailerons 120, 122 while the spoilers 124A-D, 126A-D are fully active with full system gain control. In the alternate manual flight control modes and the manual flight control modes during a system jam, autopilot is not available.

FIG. 2D depicts a table 290 of example autopilot flight control modes and example states of components included in the aircraft roll operation control system 200 of FIG. 2A. The table 290 of FIG. 2D depicts the respective states of the various electronics (e.g., the SCE controller 140, the FCC 142A-B) and actuators illustrated in FIG. 2A, which are selectively invoked to enter or exit different autopilot flight control modes, such as a Category 3B autopilot flight control mode, a Category 3A autopilot flight control mode if the aircraft 100 was dispatched with MMEL 1 equipment, a Category 3A autopilot flight control mode if the aircraft 100 was dispatched with MMEL 2 equipment. FIG. 2D also depicts respective states of the aircraft roll control surfaces, such as the ailerons 120, 122 of FIGS. 1-2A, the spoilers 124A-D, 126A-D of FIGS. 1-2A, etc.

Category 3A (IIIA) and 3B (IIIB) are described in Annex 6 to the Convention on International Civil Aviation of the International Standards and Recommended Practices (ISAR) produced by the International Civil Aviation Organization (ICAO). The essence of Annex 6 is that the operation of aircraft engaged in international air transport must be as standardized as possible to ensure the highest levels of safety and efficiency. For example, Category 3B is a precision instrument approach and landing with a decision height lower than 15m (50 ft), or no decision height and a runway visual range less than 200 m (700 ft) but not less than 50 m (150 ft). Category 3A is a precision instrument approach and landing with a decision height lower than 30 m (100 ft), or no decision height and a runway visual range not less than 200 m (700 ft). Master Minimum Equipment List, or MMEL, is owned and maintained by the Federal Aviation Administration (FAA) and the European Union Aviation Safety Agency (EASA). For example, aviation regulatory agencies (e.g., the FAA, the EASA, etc.) have requirements (e.g., 14 C.F.R. § 121.628 "Inoperable Instruments and Equipment") to be satisfied before an airline operator may legally dispatch an airplane for revenue service with inoperable equipment. In such examples, the aviation regulatory agency approves an MMEL. The MMEL defines what equipment may be inoperable, the period of time this equipment may remain inoperable, etc., before repairs must be accomplished.

In the Category 3B autopilot flight control mode, the wing actuators 242, 244 are inactive because the ailerons 120, 122 are active and the spoilers 124A-D, 126A-D are fully active. For example, the Category 3B autopilot flight control mode can correspond to the normal manual flight control mode as described above in connection with FIG. 2C.

In the Category 3A autopilot flight control mode if the aircraft 100 was dispatched with MMEL 1 equipment, the first FCC 142A is off, the second FCC 142B is active, and the SCE controller 140 is active. Accordingly, the first MM actuator 236A is off while the second MM actuator 236B and the electric actuator 238 are active. In this mode, the ailerons 120, 122 are active and the spoilers 124A-D, 126A-D are fully active.

In the Category 3A autopilot flight control mode if the aircraft 100 was dispatched with MMEL 2 equipment, the first FCC 142A is active, the second FCC 142B is off, and the SCE controller 140 is active. Accordingly, the second MM actuator 236B is off while the first MM actuator 236A and the electric actuator 238 are active. In this mode, the ailerons 120, 122 are active and the spoilers 124A-D, 126A-D are fully active.

Figure 3:
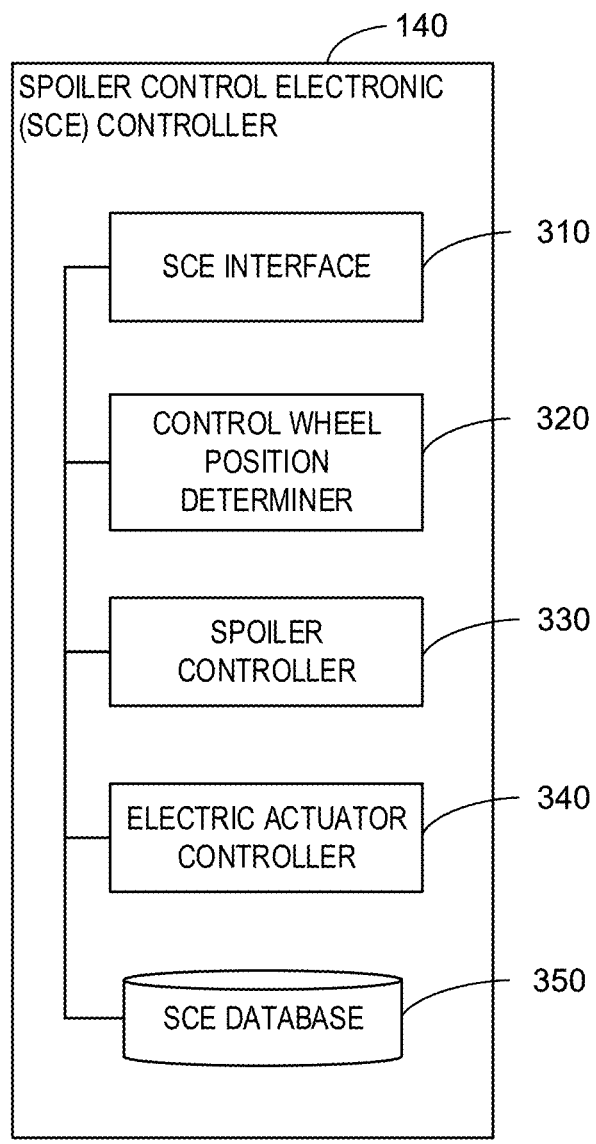
FIG. 3 is a block diagram of an example implementation of a spoiler control electronic (SCE) controller of the aircraft roll operation control system of FIG. 2A.

FIG. 3 is a block diagram of an example implementation of the SCE controller 140 of FIGS. 1 and/or 2A to control the spoilers 124A-D, 126A-D and/or the ailerons 120, 122 of FIGS. 1 and/or 2A. In the illustrated example of FIG. 3, the SCE controller 140 includes an example SCE interface 310, an example control wheel position determiner 320, an example spoiler controller 330, an example electric actuator controller 340, and an example SCE database 350.

In the illustrated example of FIG. 3, the SCE controller 140 includes the SCE interface 310 to facilitate communication with sensors and/or equipment of the aircraft roll operation control system 200 of FIG. 2A. For example, the SCE interface 310 can be a sensor and equipment interface, an SCE-FCE interface, etc. For example, the SCE interface 310 can obtain sensor data, sensor measurements, etc., from the control wheel position sensors 212, 214 (e.g., a control wheel position sensor measurement corresponding to a wheel position or wheel position value, a control wheel position or control wheel position value, etc.), and/or spoiler position sensors monitoring position(s) of the spoiler actuators 226A-D, 228A-D (e.g., a spoiler actuator position sensor measurement corresponding to a spoiler position or a spoiler position value). For example, measurements from the spoiler position sensors are obtained by the spoiler controller 330 for a closed-loop FBW control system. In such examples, the SCE interface 310 can convert electrical signals from the sensors or electric actuator to a machine readable format. For example, the SCE interface 310 can convert analog sensor signals into digital values (e.g., binary values, hexadecimal values, etc.).

In some examples, the SCE interface 310 can provide visual and/or audio feedback to pilot(s) in the cockpit 138 of FIGS. 1-2 based on sensor measurements. For example, the SCE interface 310 can communicate to a user interface in the cockpit 138 to inform the pilot(s) when a hydraulic pressure associated with one or both of the hydraulic systems 218, 220 is low and/or dropping or has already dropped beyond a pre-determined threshold (e.g., a hydraulic pressure threshold). In such examples, the SCE interface 310 can generate an auditory alert (e.g., an audible alert via one or more speakers), a visual alert on the user interface, etc., and/or a combination thereof. For example, the alerts can correspond to audible sounds, flashing lights, etc., that are indicative of particular sensor conditions based on sensor measurements.

In the illustrated example of FIG. 3, the SCE controller 140 includes the control wheel position determiner 320 to obtain control wheel position measurements from the SCE interface 310 and determine an angular position of the control wheel(s) 202, 204 based on the control wheel position measurements. In some examples, the control wheel position determiner 320 transmits the angular position to the spoiler controller 330.

In the illustrated example of FIG. 3, the SCE controller 140 includes the spoiler controller 330 to generate and transmit flight commands to the spoiler actuators 226A-D, 228A-D to control the spoilers 124A-D, 126A-D of the aircraft wings 102, 104. In some examples, the spoiler controller 330 generates flight commands based on control wheel position to actuate and/or otherwise cause the spoiler actuators 226A-D, 228A-D to engage, move, etc., to a different position, state, etc. In such examples, the spoiler controller 330 can generate the flight commands based on data obtained from the SCE interface 310. In other examples, the spoiler controller 330 can obtain autopilot flight commands from the aileron controller 430 to control the spoiler actuators 226A-D, 228A-D.

In the illustrated example of FIG. 3, the SCE controller 140 includes the electric actuator controller 340 to generate and transmit flight commands to the electric actuator 238 to control the aileron actuators 230, 232. In some examples, the electric actuator controller 340 works with and/or otherwise in combination with the FCC 142A-B to control the aileron actuators 230, 232. In some examples, the electric actuator controller 340 generates flight commands based on the control wheel position. In some examples, the electric actuator controller 340 controls the electric actuator 238 in response to either one of the two hydraulic systems 218, 220 not responding and/or at pilot discretion when operating under the normal control mode. In some examples, the electric actuator controller 340 generates and transmits control wheel positions to the FCC 142A-B, which, in turn cause, direct, and/or otherwise instruct the FCC 142A-B to activate analog signal output(s) to control one(s) of the wing actuators 242, 244 via the analog circuit coupling 240.

In the illustrated example of FIG. 3, the SCE controller 140 includes the SCE database 350 to record data (e.g., sensor data, sensor measurements, generated flight commands, generated alerts, etc.). The SCE database 350 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The SCE database 350 may additionally or alternatively be implemented by one or more double data rate (DDR) memories, such as DDR, DDR2, DDR3, DDR4, mobile DDR (mDDR), etc. The SCE database 350 may additionally or alternatively be implemented by one or more mass storage devices such as hard disk drive(s), compact disk drive(s), digital versatile disk drive(s), solid-state disk drive(s), etc. While in the illustrated example the SCE database 350 is illustrated as a single database, the SCE database 350 may be implemented by any number and/or type(s) of databases. Furthermore, the data stored in the SCE database 350 may be in any data format such as, for example, binary data, comma delimited data, tab delimited data, structured query language (SQL) structures, etc.

While an example manner of implementing the SCE controller 140 of FIGS. 1-2 is illustrated in FIG. 3, one or more of the elements, processes, and/or devices illustrated in FIG. 3 may be combined, divided, re-arranged, omitted, eliminated, and/or implemented in any other way. Further, the example SCE interface 310, the example control wheel position determiner 320, the example spoiler controller 330, the example electric actuator controller 340, the example SCE database 350, and/or, more generally, the example SCE controller 140 of FIG. 3 may be implemented by hardware, software, firmware, and/or any combination of hardware, software, and/or firmware. Thus, for example, any of the example SCE interface 310, the example control wheel position determiner 320, the example spoiler controller 330, the example electric actuator controller 340, the example SCE database 350, and/or, more generally, the example SCE controller 140 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example SCE interface 310, the example control wheel position determiner 320, the example spoiler controller 330, the example electric actuator controller 340, and the example SCE database 350 is/are hereby expressly defined to include a non-transitory computer readable storage device or storage disk such as a memory, a digital versatile disk (DVD), a compact disk (CD), a Blu-ray disk, etc., including the software and/or firmware. Further still, the example SCE controller 140 of FIGS. 1-2 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
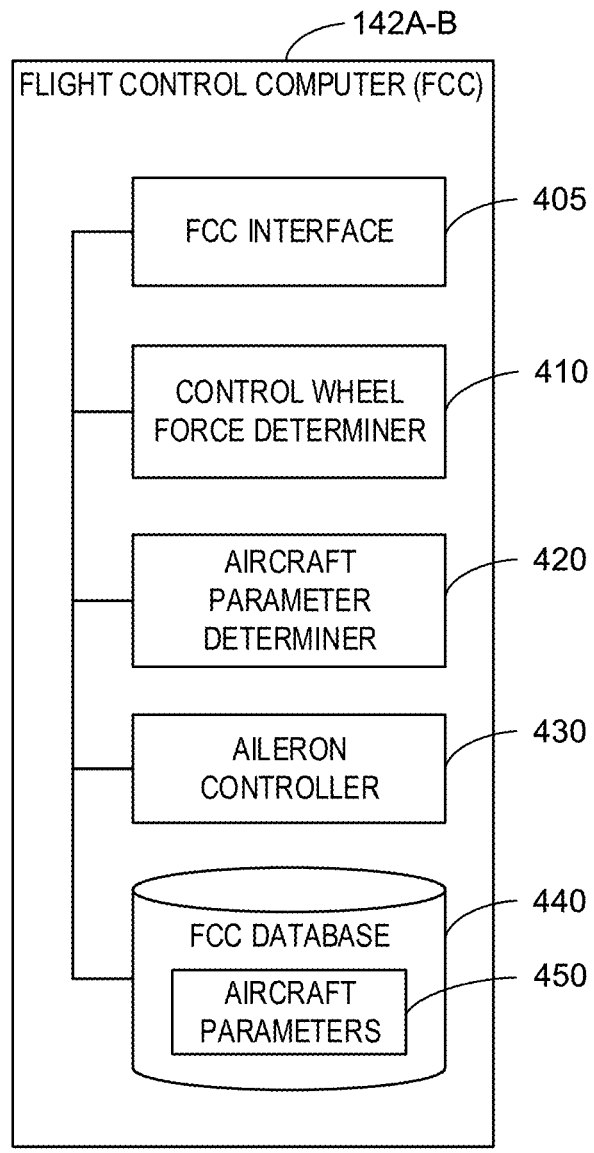
FIG. 4 is a block diagram of an example implementation of a flight control computer (FCC) of the aircraft roll operation control system of FIG. 2A.

FIG. 4 is a block diagram of an example implementation of the FCC 142A-B of FIGS. 1 and/or 2A to control the MM actuators 236A, 236B. In the illustrated example of FIG. 4, the FCC 142A-B includes an example FCC interface 405, the control wheel force determiner 410, an example aircraft parameter determiner 420, the aileron controller 430, and an example FCC database 440 including example aircraft parameters 450.

In the illustrated example of FIG. 4, the FCC 142A-B includes the FCC interface 405 to facilitate communication with sensors and equipment of the aircraft roll operation control system 200 of FIG. 2A. For example, the FCC interface 405 can be an equipment and sensor interface. For example, the FCC interface 405 can obtain sensor data, sensor measurements, etc., from the force sensor 208, the control wheel position sensors 212, 214, the pressure sensors 222, 224, and/or the solenoid valve(s) of aileron actuators 230, 232. In some examples, the FCC interface 405 can determine whether pressure measurement(s) associated with the hydraulic system(s) 218, 220 satisfy a threshold (e.g., a pre-defined threshold, a pressure threshold, etc.) based on pressure sensor 222, 224 measurements. In some examples, the FCC interface 405 can invoke the alternate control mode by de-energizing the solenoid valves of aileron actuators 230, 232 and transmitting an analog signal to the wing actuators 242, 244 through the analog circuit 240. In some examples, the FCC interface 405 of the FCC 142A-B provides visual and/or audio feedback to pilot(s) in the cockpit 138 of FIGS. 1-2 based on sensor conditions as described above in connection with FIG. 3. In some examples, the FCC interface 405 controls and/or otherwise invokes the back-drive actuator 211 of FIG. 2A to back-drive one or more of the control wheels 202, 204 to provide visual feedback to the pilot(s) indicating that autopilot is controlling the aircraft 100.

In the illustrated example of FIG. 4, the FCC 142A-B includes the control wheel force determiner 410 to obtain control wheel force measurements from the force sensor 208 via the FCC interface 405 and determine the amount of force (e.g., a force value) being applied to the control wheel(s) 202, 204 by the pilot(s). In some examples, the control wheel force determiner 410 records the pilot input force values from the force sensor 208 in the FDR 213. For example, the pilot input force values and other data can be used for pilot training or for aircraft data analysis.

In the illustrated example of FIG. 4, the FCC 142A-B includes the aircraft parameter determiner 420 to determine aircraft parameters 450 based on sensor data and/or determine whether autopilot (e.g., autopilot control of the aircraft 100 of FIG. 1) is engaged. In some examples, the aircraft parameter determiner 420 determines the aircraft parameters 450 based on data obtained from the FCC interface 405 and determines whether autopilot is engaged based on the aircraft parameters 450. In such examples, the aircraft parameter determiner 420 can transmit a message, a notification, etc., to the FCC interface 405, the control wheel position determiner 320, and/or the control wheel force determiner 410, where the message, the notification, etc., includes an indication whether autopilot performance is normal or abnormal and/or any pilot action is to be required.

In some examples, the aircraft parameter determiner 420 obtains the aircraft parameters 450 that include inertial reference unit (IRU) data (e.g. airspeed, angle of attack, altitude, position), pitot static data, antenna readings, etc., and/or other airplane systems sensor data. In some examples, the aircraft parameters 450 are representative of an operating condition of the aircraft 100. For example, the IRU data, the pitot static data, etc., can correspond and/or otherwise be representative of an operating condition of the aircraft 100.

In some examples, the aircraft parameter determiner 420 transmits the aircraft parameters 450 to the user interface of the cockpit 138 to provide navigational information and/or the status of aircraft roll operation control system 200 components to various flight deck displays in the cockpit 138. In such examples, the aircraft parameters 450 can be generated by internal and/or external sensors that monitor aircraft conditions (e.g., an operating condition) and environmental conditions.

In the illustrated example of FIG. 4, the FCC 142A-B includes the aileron controller 430 to generate and transmit flight commands to the MM actuators 236A, 236B to control the aileron actuators 230, 232. In some examples, the aileron controller 430 generates flight commands based on control wheel position to control the MM actuators 236A, 236B. In such examples, the aileron controller 430 can generate the flight commands based on data obtained from the FCC interface 405. In other examples, the aileron controller 430 can generate flight commands based on the aircraft parameters 450 (e.g., autopilot aircraft parameters, autopilot flight parameters, etc.) to control the MM actuators 236A, 236B and/or the electric actuator 238. In some examples, the aileron controller 430 activates analog signal output(s) of the aileron controller 430 and/or, more generally, the FCC 142A-B, to control one(s) of the wing actuators 242, 244 via the analog circuit coupling 240 of FIG. 2A. For example, the aileron controller 430 can control one(s) of the wing actuators 242, 244 via a change in current, voltage, etc., and/or a combination thereof via the analog circuit coupling 240.

In the illustrated example of FIG. 4, the FCC 142A-B includes the FCC database 440 to record data (e.g., sensor data, sensor measurements, generated flight commands, generated alerts, etc.). The FCC database 440 may be implemented by a volatile memory (e.g., a SDRAM, DRAM, RDRAM, etc.) and/or a non-volatile memory (e.g., flash memory). The FCC database 440 may additionally or alternatively be implemented by one or more DDR memories, such as DDR, DDR2, DDR3, DDR4, mDDR, etc. The FCC database 440 may additionally or alternatively be implemented by one or more mass storage devices such as hard disk drive(s), compact disk drive(s), digital versatile disk drive(s), solid-state disk drive(s), etc. While in the illustrated example the FCC database 440 is illustrated as a single database, the FCC database 440 may be implemented by any number and/or type(s) of databases. Furthermore, the data stored in the FCC database 440 may be in any data format such as, for example, binary data, comma delimited data, tab delimited data, SQL structures, etc.

While an example manner of implementing the example FCC 142A-B of FIGS. 1-2 is illustrated in FIG. 4, one or more of the elements, processes, and/or devices illustrated in FIG. 4 may be combined, divided, re-arranged, omitted, eliminated, and/or implemented in any other way. Further, the example FCC interface 405, the example control wheel force determiner 410, the example aircraft parameter determiner 420, the example aileron controller 430, the example FCC database 440, and/or, more generally, the example FCC 142A-B of FIG. 4 may be implemented by hardware, software, firmware, and/or any combination of hardware, software, and/or firmware. Thus, for example, any of the example FCC interface 405, the example control wheel force determiner 410, the example aircraft parameter determiner 420, the example aileron controller 430, the example FCC database 440, and/or, more generally, the example FCC 142A-B could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example FCC interface 405, the example control wheel force determiner 410, the example aircraft parameter determiner 420, the example aileron controller 430, and/or the example FCC database 440 is/are hereby expressly defined to include a non-transitory computer readable storage device or storage disk such as a memory, a DVD, a CD, a Blu-ray disk, etc., including the software and/or firmware. Further still, the example FCC 142A-B of FIGS. 1-2 may include one or more elements, processes, and/or devices in addition to, or instead of, those illustrated in FIG. 4, and/or may include more than one of any or all of the illustrated elements, processes, and devices.

In examples disclosed herein, the SCE controller 140 and/or the FCC 142A-B determine the mode in which the SCE controller 140, the FCC 142A-B, and/or, more generally, the aircraft roll operation control system 200 operates. As previously mentioned, the aircraft roll operation control system 200 can operate in the autopilot control mode (e.g., a control or operating mode based on aircraft parameters where hydraulic power is available), the normal control mode (e.g., a control or operating mode based on pilot inputs where (1) there is no mechanical control jam and (2) hydraulic pressure allows actuation), the jam control mode (e.g., a control or operating mode where there is a mechanical control jam), and/or the alternate control mode (e.g., a control or operating mode where (1) hydraulic power is not available and (2) the aileron actuators are in a block position). As used herein, active mode can refer to any operating mode that is not the alternate control mode (e.g., autopilot control mode, normal control mode, and/or jam control mode). For example, when the aileron actuators 230, 232 are in active mode, the aircraft roll operation control system 200 can operate in autopilot control mode, normal control mode, or jam control mode. Each operating mode can be invoked by the pilot or automatically invoked in response to an aircraft component (e.g., hydraulic systems 218, 220, electric actuator 238, pressure sensors 222, 224, etc.) not functioning properly and/or otherwise operating in a non-responsive manner or mode of operation.

In some examples, the aircraft 100 of FIG. 1 operates in autopilot control mode when the FCC 142A-B generates autopilot flight commands. In such examples, the FCC 142A-B can control the spoiler actuators 226A-D, 228A-D and the MM actuators 236A, 236B based on the autopilot flight commands. The aileron controller 430 can transmit the autopilot flight commands to the SCE controller 140 to control the motion, the movement, etc., of the spoilers 124A-D, 126A-D. The FCC 142A-B can control the MM actuators 236A, 236B based on the autopilot flight commands to control the aileron actuators 230, 232 that are operatively coupled to the wing cable system 234 to move the ailerons 120, 122.

In some examples, the aircraft 100 operates in normal control mode when the SCE controller 140 and/or the FCC 142A-B generate flight commands based on the control wheel position. In such examples, the spoiler controller 330 can control the spoiler actuators 226A-D, 228A-D based on the flight commands to control the motion, the movement, etc., of the spoilers 124A-D, 126A-D. In such examples, the FCC 142A-B can control the MM actuators 236A, 236B based on the flight commands to control the aileron actuators 230, 232 that are operatively coupled to the wing cable system 234 to move the ailerons 120, 122. In some examples, in response to pilot discretion and/or one of the two MM actuators 236A, 236B not responding to flight commands, the electric actuator controller 340 can invoke the electric actuator 238 to actuate (e.g., activate, enable, etc.) the actuator input levers of aileron actuators 230, 232 that are operatively coupled to the wing cable system 234 to control the ailerons 120, 122. Additional detail regarding the aileron actuator input levers are discussed further in connection with FIGS. 5A-6B.

In some examples, in response to a jam (e.g., a mechanical control jam), the aircraft 100 operates in the jam control mode. For example, in response to the first shaft 203A being jammed, the aircraft roll operation control system 200 can be in the jam control mode. In such examples, the spoiler controller 330 can control the spoiler actuators 226A-D, 228A-D based on the second control wheel position sensor 214 to control the spoilers 124A-D, 126A-D. In other examples, in response to the fourth shaft 205B being jammed, the aircraft roll operation control system 200 can be in the jam control mode. In such examples, the spoiler controller 330 can control the spoiler actuators 226A-D, 228A-D based on the first control wheel position sensor 212 to control the spoilers 124A-D, 126A-D. In such examples, the jam override device 210 can be used in conjunction with one of the first control wheel 202 or the second control wheel 204 to override the mechanical control jam and generate an input to a corresponding one of the control wheel position sensors 212, 214.

In some examples, in response to both of the hydraulic systems 218, 220 being inoperable (e.g., having low pressure), the aircraft 100 operates in the alternate control mode. For example, the FCC 142A-B can de-energize the solenoid valves of the aileron actuators 230, 232 to cause the aileron actuators 230, 232 to switch (e.g., adjust, modify, invoke, control, etc.) the MSV 504 of FIGS. 5A-6B from the active position to the block position to prevent fluid (e.g., hydraulic fluid) from flowing throughout the aileron actuators 230, 232. In such examples, the wing actuators 242, 244 can be invoked to control the ailerons 120, 122 through the differential linkages 246, 248. Additional description in connection with the MSV 504 and corresponding aileron actuator 230, 232 components is provided below in connection with FIGS. 5A-6B.

FIG. 5A is an example implementation of an actuator 500 that can be included in the aircraft roll operation control system 200 of FIG. 2A. For example, the actuator 500 can correspond to an example implementation of the aileron actuators 230, 232 of FIG. 2A. In such examples, one(s) of the aileron actuator(s) 230, 232 can be implemented by the actuator 500. In some such examples, the actuator 500 can correspond to an actuator of a flight control surface such as the first aileron 120 of FIGS. 1-2A.

The example of FIG. 5A illustrates a flow of hydraulic fluid within the actuator 500 and corresponding interior actuations or control mechanisms in response to the first hydraulic system 218 and the second hydraulic system 220 being responsive and/or otherwise operating without malfunction. In FIG. 5A, the actuator 500 includes the MCV 502, the MSV 504, and the solenoid valve 506.

In the example of FIG. 5A, the MCV 502 includes a first example MCV chamber 508, a second example MCV chamber 510, a third example MCV chamber 512, and an example actuator input lever 513. The first MCV chamber 508 includes a first example MCV port 514, a second example MCV port 516, a third example MCV port 518, and a fourth example MCV port 520. The first MCV port 514 and the third MCV port 518 are on a first side of the MCV 502 and the second MCV port 516 and the fourth MCV port 520 are on a second side of the MCV 502, where the first side is opposite the second side.

In the example of FIG. 5A, the second MCV chamber 510 includes a fifth example MCV port 522, a sixth example MCV port 524, a seventh example MCV port 526, and an eighth example MCV port 528. The fifth MCV port 522 and the seventh MCV port 526 are on the first side of the MCV 502 and the sixth MCV port 524 and the eighth MCV port 528 are on the second side of the MCV 502.

In the example of FIG. 5A, the third MCV chamber 512 includes a ninth example MCV port 530, a tenth example MCV port 532, an eleventh example MCV port 534, and a twelfth example MCV port 536. The ninth MCV port 530 and the eleventh MCV port 534 are on the first side of the MCV 502 and the tenth MCV port 532 and the twelfth MCV port 536 are on the second side of the MCV 502.

In the illustrated example of FIG. 5A, the MSV 504 includes an example control port (e.g., an MSV control port) 537, a first example MSV chamber 538, a second example MSV chamber 540, and a third example MSV chamber 542. The first MSV chamber 538 includes a first example MSV port 544, a second example MSV port 546, a third example MSV port 548, and a fourth example MSV port 550. The first MSV port 544 and the third MSV port 548 are on a first side of the MSV 504 and the second MSV port 546 and the fourth MSV port 550 are on a second side of the MSV 504, where the first side is opposite the second side.

In the example of FIG. 5A, the second MSV chamber 540 includes a fifth example MSV port 552, a sixth example MSV port 554, a seventh example MSV port 556, and an eighth example MSV port 558. The fifth MSV port 552 and the seventh MSV port 556 are on the first side of the MSV 504 and the sixth MSV port 554 and the eighth MSV port 558 are on the second side of the MSV 504.

In the example of FIG. 5A, the third MSV chamber 542 includes a ninth example MSV port 560, a tenth example MSV port 562, an eleventh example MSV port 564, and a twelfth example MSV port 566. The ninth MSV port 560 and the eleventh MSV port 564 are on the first side of the MSV 504 and the tenth MSV port 562 and the twelfth MSV port 566 are on the second side of the MSV 504.

In the illustrated example of FIG. 5A, the MCV 502 can have and/or otherwise be switched into three different positions, configurations, modes, etc., including a first MCV position (e.g., an actuator extension position) as depicted in FIG. 5A, a second MCV position (e.g., a neutral position, a rest position, etc.) as depicted in FIG. 5B, or a third MCV position (e.g., a retracting position, a retraction position, etc.) as depicted in FIG. 5C. For example, the actuator 500 can cause one of the ailerons 120, 122 to extend when in the first MCV position, to be at rest when in the second MCV position, or to retract when in the third MCV position.

In the illustrated example of FIG. 5A, the MSV 504 can have and/or otherwise be switched into three different positions, configurations, modes, etc., including active (e.g., an active position, an active configuration, an active mode, etc.), bypass (e.g., a bypass position, a bypass configuration, a bypass mode, etc.), or block (e.g., a block position, a block configuration, a block mode, etc.). In FIG. 5A, the MSV 504 is in the active position where aircraft hydraulic pressure is normal or typical. In FIG. 6A, the MSV 504 is in the bypass position. In FIG. 6B, the MSV 504 is in the block position.

In the illustrated example of FIG. 5A, the actuator 500 includes an example supply line 568, an example return line 570, an example fluid filter (e.g., an inlet fluid filter, an inlet filter, etc.) 572, an example actuator piston rod 574, a first example chamber (e.g., a first actuator chamber) 576, and a second example chamber (e.g., a second actuator chamber) 578. In FIG. 5A, the supply line 568 and the return line 570 can be coupled to one of the hydraulic systems 218, 220 of FIG. 2A. For example, the actuator 500 can be coupled to the supply line 568 and the return line 570 of one of the hydraulic systems 218, 220. In FIG. 5A, the supply line 568 and the return line 570 have sufficient pressure to operate the aircraft roll operation control system 200 in a normal or typical manner.

In the illustrated example of FIG. 5A, the exchange of fluid volume between the first chamber 576 and the second chamber 578 defines the position of the actuator piston rod 574. In FIG. 5A, the first MCV port 514 is coupled to the supply line 568 and allows fluid to flow into (e.g., towards the MCV 502) the MCV 502. In FIG. 5A, the fourth MCV port 520 is coupled to the return line 570 and allows fluid to flow out (e.g., towards the return line 570) of the MCV 502. In some examples, the actuator 500 can be actuated by adjusting the fluid flow in and out of the first chamber 576 and the second chamber 578. For example, fluid can flow into the actuator 500 via the supply line 568 where the fluid is filtered by the fluid filter 572. In such examples, the fluid filter 572 can be a suction filter. The fluid filter 572 can be a low, medium, and/or high-pressure filter.

In some examples, the fluid flows from the fluid filter 572 through the MCV 502, the MSV 504, and into the first chamber 576 to push the actuator piston rod 574 in a first direction (e.g., to the right in FIG. 5A). In some examples, the fluid flows from the fluid filter 572 through the MCV 502, the MSV 504, and into the second chamber 578 to push the actuator piston rod 574 in a second direction (e.g., to the left in FIG. 5A) opposite the first direction. In some examples, the MCV 502 is positioned to prevent fluid from flowing through the MCV 502 and into the first chamber 576 or the second chamber 578. In such examples, the actuator input lever 513 dictates and/or otherwise controls the position of the MCV 502 and the fluid flow through the actuator 500. The fluid that flows through the MCV 502 and into the first chamber 576 forces the fluid in the second chamber 578 to exit the actuator 500 through the return line 570 to return to at least one of the hydraulic systems 218, 220 of FIG. 2A.

In FIG. 5A, the MSV 504 has a first example spring (e.g., a valve spring, a compression spring, etc.) 579. In FIG. 5A, the first spring 579 is reacting to hydraulic pressure existing in the supply line 568 at the control port 537. Accordingly, the first spring 579 has a first example compression length L1 580. When the MSV 504 is in the active position as depicted in FIG. 5A, the fluid in the supply line 568 and in the return line 570 can be coupled to the first chamber 576 and the second chamber 578 as depicted in FIG. 5B or FIG. 5C.

The actuator 500 can extend one(s) of the aileron(s) 120, 122 when the actuator input lever 513 is in the first position as depicted in FIG. 5A. The actuator 500 is at rest when the actuator input lever 513 is in the second position as depicted in FIG. 5B. For example, one(s) of the aileron(s) 120, 122 are not moving when the actuator input lever 513 is in the second position. The actuator 500 can retract one(s) of the aileron(s) 120, 122 when the actuator input lever 513 is in the third flow position as depicted in FIG. 5C.

In the illustrated example of FIG. 5A, the second MCV port 516 is coupled to the first MSV port 544. In FIG. 5A, the second MSV port 546 is coupled to the first chamber 576. In FIG. 5A, the fourth MSV port 550 is coupled to the second chamber 578. In FIG. 5A, the third MSV port 548 is coupled to the fourth MCV port 520.

In the example of FIG. 5A, the actuator input lever 513 is positioned in the first position to extend (e.g., to move from a first position to a second position) the actuator piston rod 574 when the MSV 504 is in the active position so that fluid can flow from the supply line 568 to the first chamber 576 and fluid can flow from the second chamber 578 back to the return line 570. In such examples, fluid can flow along a path that includes the supply line 568, the first MCV port 514, the second MCV port 516, the first MSV port 544, the second MSV port 546, the first chamber 576, the second chamber 578, the fourth MSV port 550, the third MSV port 548, the fourth MCV port 520, and the third MCV port 518. In the example of FIG. 5A, to retract the actuator piston rod 574, the actuator input lever 513 is positioned as depicted in FIG. 5C.

In the illustrated example of FIG. 5A, the solenoid valve 506 includes example solenoids (e.g., solenoid coils, solenoid electrical coils, etc.) 581A, 581B including a first example solenoid (e.g., a first solenoid electrical coil) 581A and a second example solenoid (e.g., a second solenoid electrical coil) 581B, a first example solenoid chamber 582 and a second example solenoid chamber 584. In FIG. 5A, the first solenoid chamber 582 includes a first example solenoid valve port 586, a second example solenoid valve port 588, and a third example solenoid valve port 590. In FIG. 5A, the second solenoid chamber 584 includes a fourth example solenoid valve port 592, a fifth example solenoid valve port 594, and a sixth example solenoid valve port 596. In FIG. 5A, the solenoid valve 506 has a second example spring (e.g., a valve spring, a compression spring, etc.) 598. In FIG. 5A, the second spring 598 has a fourth example compression length L4 599 in response to the solenoids 581A-B being energized.

FIG. 6A depicts the actuator 500 of FIGS. 5A-5C in a bypass position. For example, a respective one of the wing actuators 242, 244 of FIG. 2A is not operable when the MSV 504 of a corresponding one of the aileron actuators 230, 232 is in either the active position or the bypass position. FIG. 6A illustrates a flow of hydraulic fluid within the actuator 500 and corresponding interior actuations or control mechanisms in response to either of the first hydraulic system 218 or the second hydraulic system 220 of FIG. 2A being non-responsive and/or otherwise not having normal or typical fluid pressure.

In the example of FIG. 6A, the actuator 500 has abnormal pressure at the supply line 568. In FIG. 6A, the control port 537 also has abnormal pressure, which causes the first spring 579 to have a second example compression length L2 602. In the example of FIG. 6A, the MSV 504 has automatically switched from the active position of FIG. 5A to the bypass position. In bypass mode, the actuator 500 is to be back driven by the operation of a different active aileron actuator (e.g., a different one of the aileron actuators 230, 232 of FIG. 2A). The back-driven motion causes the fluid in the first chamber 576 and the second chamber 578 to flow to the third solenoid valve port 590, exit the first solenoid valve port 586, and then flow to the control port 537, and with a residual pressure at the control port 537. The residual pressure at the control port 537 allows the MSV 504 to be maintained in the bypass position.

In the illustrated example of FIGS. 5A-5C and/or 6A, the solenoid valve 506 can be actuated in response to applying an analog signal (e.g., a voltage, a current, etc.) the solenoid coils 581A-B. In FIGS. 5A-5C and/or 6A, the FCC 142A-B of FIGS. 1, 2A, and/or 4 can apply and/or otherwise provide the analog signal to both solenoid coils 581A-B to actuate the solenoid valve 506. In FIGS. 5A-5C and/or 6A, the solenoid coils 581A-B, and/or, more generally, the solenoid valve 506, is in an active or energized position. For example, the FCC 142A-C can provide a current, a voltage, etc., to energize the solenoid coils 581A-B (e.g., the solenoid valve 506 is turned on and/or otherwise enabled) to maintain the position of the solenoid valve 506 as depicted in FIGS. 5A-5C and/or 6A.

When in the bypass position as depicted in FIG. 6A, the MSV 504 can bypass the MCV 502. The MSV 504 can move to the bypass position in response to motion from the first spring 579 of the MSV 504. In FIG. 6A, the first spring 579 applies force to the MSV 504. In FIG. 6A, the first spring 579 has the second compression length L2 602 when the MSV 504 is in the bypass position, which is less than the first compression length L1 580 of FIGS. 5A-5C when the MSV 504 is in the active position. In the examples of FIGS. 5A-5C and 6A, the first compression length L1 580 of FIGS. 5A-5C is greater in length than the second compression length L2 602 of FIG. 6A.

In the example of FIG. 6A, the first spring 579 can apply a constant amount or quantity of force to the MSV 504 to move the MSV 504 in response to a low pressure within a corresponding one of the hydraulic systems 218, 220. In some examples, when the pressure in the supply line 568, which is coupled to the supply line 568, decreases (e.g., in response to a hydraulic fluid leak), the FCC 142A-B can electrically de-activate both solenoid coils 581A-B to move the MSV 504 to the block mode position as illustrated in FIG. 6B.

In the illustrated example of FIG. 6A, the supply line 568 is coupled to the fifth MCV port 522, the sixth MCV port 524 is coupled to the fifth MSV port 552, and the sixth MSV port 554 is coupled to the first chamber 576. In FIG. 6A, the second chamber 578 is coupled to the eighth MSV port 558, the seventh MSV port 556 is coupled to the eighth MCV port 528, and the seventh MCV port 526 is coupled to the return line 570. In FIG. 6A, the first solenoid valve port 586 is coupled to the control port 537, the second solenoid valve port 588 is coupled to the supply line 568, and the third solenoid valve port 590 is coupled to the fourth MSV port 550.

When the MSV 504 is in the bypass position as depicted in FIG. 6A, fluid no longer flows from the supply line 568 to the return line 570 because the MSV 504 prevents fluid flow between the fifth MSV port 552 and the sixth MSV port 554 and between the seventh MSV port 556 and the eighth MSV port 558. In response to at least one of the hydraulic systems 218, 220 being functionally and/or otherwise responsive, the FCC 142A-B of FIGS. 1, 2A, and/or 4 can energize both solenoid coils 581A-B of the solenoid valve 506 to maintain the position of the solenoid valve 506 in FIG. 6A as the same position as depicted in FIGS. 5A-5C.

FIG. 6B depicts the actuator 500 of FIGS. 5A-6A in a block position. For example, a respective one of the wing actuators 242, 244 of FIG. 2A is operable when the MSV 504 of a corresponding one of the aileron actuators 230, 232 is in the block position. The bypass position allows control of the ailerons 120, 122 of FIGS. 1-2 by one of the aileron actuators 230, 232 while the other aileron actuator 230, 232 is inoperable and/or otherwise non-responsive to control.

In the illustrated example of FIG. 6B, the sixth MCV port 524 is coupled to the ninth MSV port 560 and the tenth MSV port 562 is coupled to the first chamber 576. In FIG. 6B, the second chamber 578 is coupled to the twelfth MSV port 566 and the eleventh MSV port 564 is coupled to the eighth MCV port 528. In FIG. 6B, the fourth solenoid valve port 592 is coupled to the control port 537, the fifth solenoid valve port 594 is coupled to the supply line 568, and the sixth solenoid valve port 596 is coupled to the twelfth MSV port 566.

In some examples, when the supply line 568 at both aileron actuators 230, 232 does not have enough pressure (e.g., in response to a hydraulic fluid leak), as sensed by hydraulic pressure sensors 222, 224, the FCC 142A-B de-energizes both solenoid coils 581A-B, which causes the second spring 598 to extend with a fifth compression length L5 606. The fifth compression length L5 606 is greater in length than the fourth compression length L4 599 of FIG. 6A. This de-energization of the solenoid coils 581A-B removes the residual pressure at the control port 537, which enables the first spring 579 to push the MSV 504 to the block position. By pushing the MSV 504 to the block position, fluid is prevented from flowing through the aileron actuator(s) 230, 232. In such examples, the first chamber 576 and the second chamber 578 maintain constant volumes when the MSV 504 is in the block position. For example, the first chamber 576 can maintain a constant volume in the first chamber 576 and/or, more generally, the actuator 500. In such examples, the second chamber 578 can maintain a constant volume in the second chamber 578 and/or, more generally, the actuator 500. In FIG. 6B, the first spring 579 has a third example compression length L3 604 that is longer in length than the first compression length L1 580 depicted in FIGS. 5A-5C and the second compression length L2 602 depicted in FIG. 6A.

As previously mentioned, the aircraft roll operation control system 200 is operating in the alternate control mode when the MSV(s) 504 is/are in the block position. Advantageously, by switching the MSV 504 into the block position, the aileron actuators 230, 232 can be restricted from actuating and, thus, allow the wing actuators 242, 244 to properly control the ailerons 120, 122 without movement of wing cable(s) included in the wing cable system 234. Additional detail in connection with the alternate control mode and the wing actuators 242, 244 is described below in reference with FIGS. 7A-7C and/or FIG. 12.

Figure 7C:
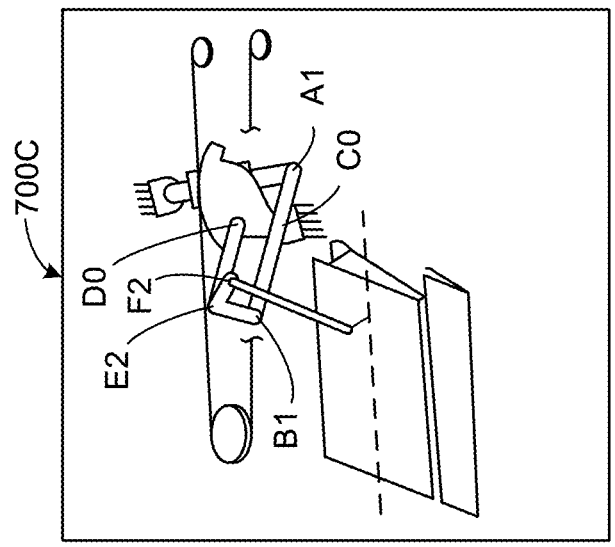
FIGS. 7A, 7B, and 7C are diagrams representative of example wing actuators and a differential linkage used to control the aircraft ailerons.
Figure 7B:
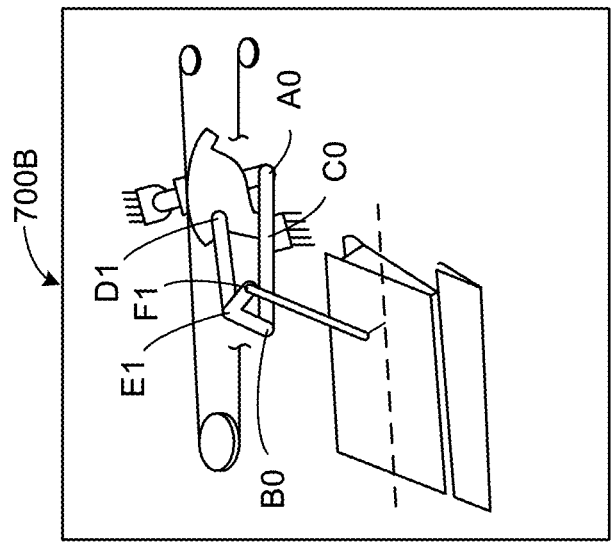
Figure 7A:
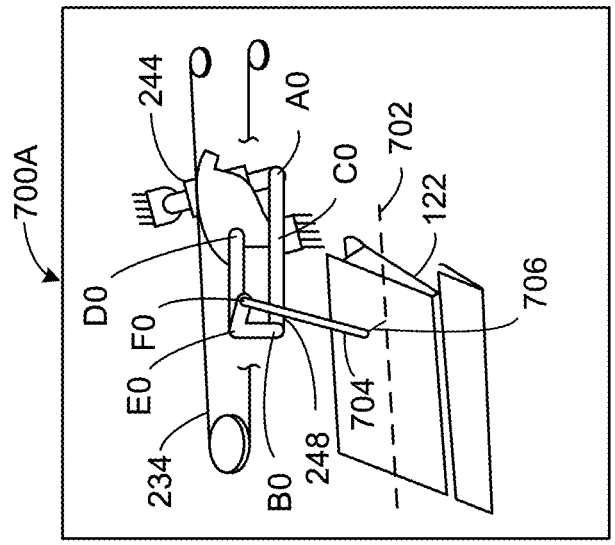

FIGS. 7A, 7B, and 7C are representative of the differential linkages 246, 248 of FIG. 2A in different positions. In the illustrated examples of FIGS. 7A-7C, the second differential linkage 248, the second wing actuator 244, and the wing cable system 234 of FIG. 2A are depicted in different orientations. Additionally, FIGS. 7A-7C include an example aileron hinge line 702, an example control rod 704, and an example aileron horn arm 706. In FIGS. 7A-7C, the control rod 704 is coupled to the differential linkage 248 at a linkage point F0. The control rod 704 is coupled to the aileron horn arm 706 and the aileron horn arm 706 is coupled to the aileron 122. The location at which the aileron horn arm 706 couples to the aileron 122 dictates and/or otherwise controls the location of the aileron hinge line 702 as depicted in FIGS. 7A-7C.

FIG. 7A depicts an example diagram 700A representative of a first position of the differential linkage 248 of FIG. 2A, used to control the rotational movement or displacement of the aileron 122, when in a neutral position (e.g., a starting position). The neutral position of the differential linkage 248 is referenced by and/or otherwise corresponds to example linkage points A0-F0 and are used to distinguish between linkage points that move in relation to the neutral position as depicted in FIGS. 7B and 7C. In FIGS. 7A-7C, the linkage point C0 is a fixed rotational point and does not translate.

FIG. 7B depicts an example diagram 700B representative of a second position of the differential linkage 248 of FIG. 2A when the aircraft roll operation control system 200 is operating in an active mode (e.g., the autopilot control mode, the normal control mode, or the jam control mode). For example, as described above in connection with FIG. 6A, during operation in the active mode, the aileron actuators 230, 232 can actuate and allow for the wing cable system 234 to actuate, move, etc. In FIG. 7B, the wing cable system 234 is actuated by clockwise rotation of the cable quadrant 252 which also moving the linkage points D0, E0, and F0 of FIG. 7A to new locations of D1, E1, and F1 as shown. Linkage points A0, B0, and C0 stay in the neutral position due to the wing actuator 244 not moving during the active mode. As illustrated in FIG. 7B, the movement of the wing cable system 234 causes the control rod 704 to rotate the aileron 122 without the actuation of the wing actuator 244.

FIG. 7C depicts an example diagram 700C representative of a third position of the differential linkage 248 of FIG. 2A when the aircraft roll operation control system 200 is operating in the alternate control mode. For example, as described in connection with FIG. 6B, during operation in the alternate control mode, the aileron actuators 230, 232 are in block mode and, thus, the wing cable system 234 is immobilized. In FIG. 7C, the wing actuator 244 actuates and moves the linkage points A0, B0, E0, and F0 of FIG. 7A to new locations of A1, B1, E2, and F2. Linkage points C0 and D0 stay in the neutral position because the wing cable system 234 is immobilized during operation in the alternate control mode and, thus, prevents linkage point DO from rotating about linkage point C0. As illustrated in FIG. 7C, the actuation of the wing actuator 244 causes the control rod 704 to rotate the aileron 122 without the rotational movement of the wing cable system 234.

Flowcharts representative of example hardware logic, machine readable instructions, hardware implemented state machines, and/or any combination thereof for implementing the SCE controller 140 of FIGS. 1, 2, and/or 3, the FCC 142A-B of FIGS. 1, 2, and/or 4, and/or, more generally, the aircraft roll operation control system 200 of FIG. 2A are shown in FIGS. 8-12. The machine readable instructions may be an executable program or portion of an executable program for execution by a computer processor such as the processor 1312 shown in the example processor platform 1300 discussed below in connection with FIG. 13 and/or the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1312 of FIG. 13 and/or the processor 1412 of FIG. 14, but the entire program and/or parts thereof could alternatively be executed by a device other than the processor 1312 of FIG. 13, the processor 1412 of FIG. 14, and/or embodied in firmware or dedicated hardware. Further, although the example program is described with reference to the flowcharts illustrated in FIGS. 8-12, many other methods of implementing the example SCE controller 140, the FCC 142A-B, and/or, more generally, the aircraft roll operation control system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 8-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 8:
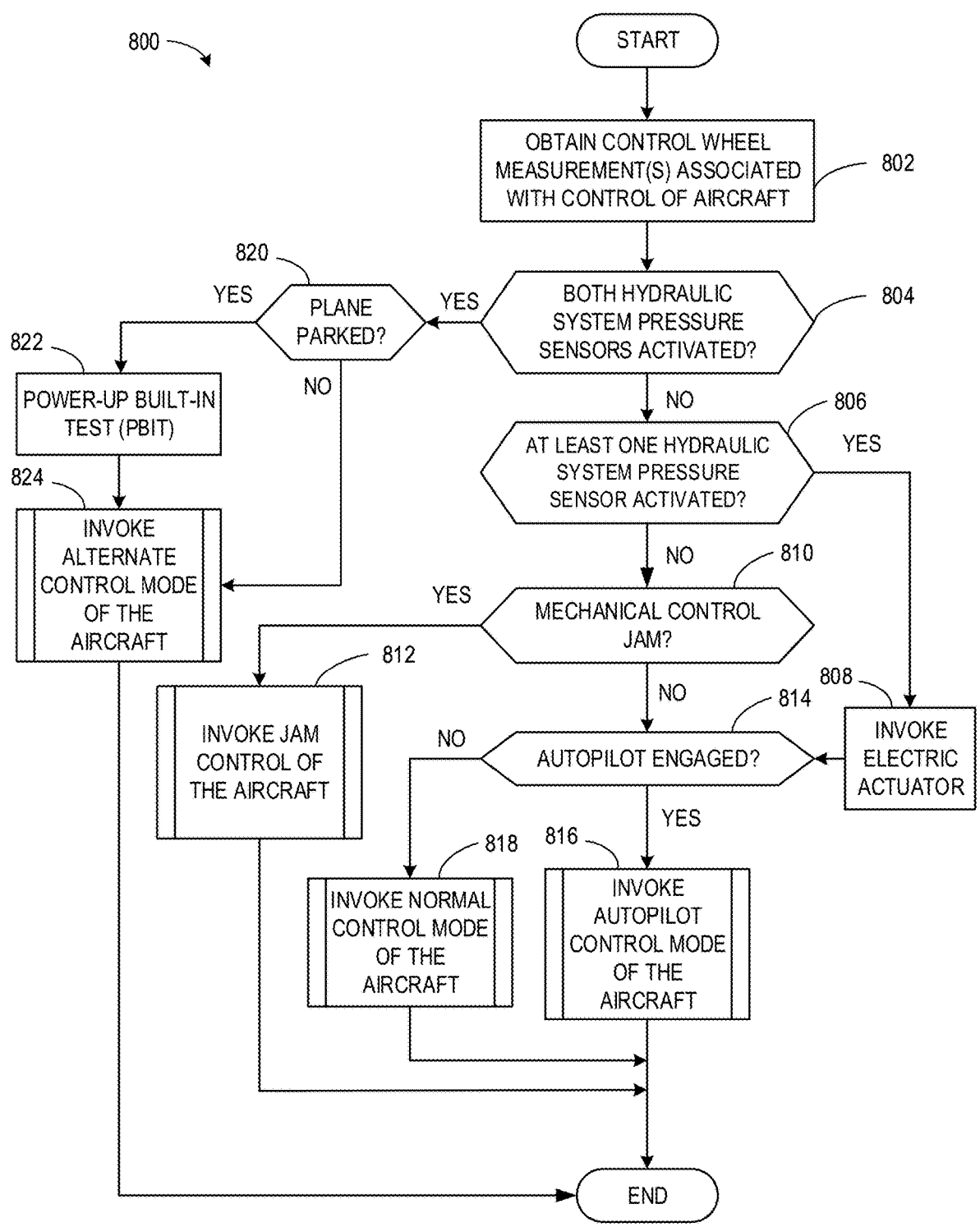
FIG. 8 is a flowchart representative of example machine readable instructions that may be executed to implement the SCE controller of FIGS. 2A and 3, the FCC of FIGS. 2A and 4, and/or, more generally, the example aircraft roll operation control system of FIG. 2A, to control aircraft roll control operations of the example aircraft of FIG. 1.

FIG. 8 is a flowchart representative of example machine readable instructions 800 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2A, to control aircraft roll control operations of the aircraft 100 of FIG. 1. The machine readable instructions 800 of FIG. 8 begin at block 802, at which the SCE controller 140 and/or the FCC 142A-B obtain control wheel measurement(s). For example, the control wheel position determiner 320 (FIG. 3) can obtain control wheel position data from the SCE interface 310 (FIG. 3), the FCC interface 405 (FIG. 4), etc. In some examples, the control wheel force determiner 410 (FIG. 4) can obtain the control wheel force from the FCC interface 405.

At block 804, the FCC 142A-B determines whether both hydraulic system 218, 220 pressure sensors 222, 224 are activated. For example, the FCC interface 405 can obtain a pressure measurement from one of the pressure sensor(s) 222, 224 of FIG. 2A and determine whether the pressure measurement associated with the hydraulic system(s) 218, 220 satisfies a threshold (e.g., a pre-defined threshold, a pressure threshold, etc.) based on the pressure measurements. In such examples, the FCC interface 405 can determine that the pressure measurement satisfies the threshold when the pressure measurement is less than the threshold. In such examples, when the pressure measurement satisfies the threshold, the pressure sensor 222, 224 activates (e.g., transmits a message, signal, etc.).

If, at block 804, the FCC 142A-B determines that both hydraulic system 218, 220 pressure sensors 222, 224 are activated, then, at block 820, the SCE controller 140 and/or the FCC 142A-B determine whether the aircraft is parked (e.g., not moving on a ground surface, not in flight, etc.). If, at block 804, the FCC 142A-B determines that both hydraulic system 218, 220 pressure sensors 222, 224 are not activated, then, at block 806, the FCC 142A-B determines whether at least one of the hydraulic system 218, 220 pressure sensors 222, 224 is activated. For example, the FCC interface 405 can determine either that none of the pressure sensors 222, 224 are activated or one of the pressure sensors 222, 224 is activated.

If, at block 806, the FCC 142A-B determines at least one of the hydraulic system 218, 220 pressure sensors 222, 224 are activated, then, at block 808, the electric actuator 238 is invoked. For example, the SCE controller 140 can turn on and/or otherwise invoke the electric actuator 238 to control the aileron actuators 230, 232. In response to invoking the electric actuator at block 808, control proceeds to block 814 to determine whether autopilot is engaged.

If, at block 806, the FCC 142A-B determines that none of the hydraulic system 218, 220 pressure sensors 222, 224 are activated, then, at block 810, the SCE controller 140 determines whether there is a mechanical control jam. For example, the spoiler controller 330 (FIG. 3) can obtain a force measurement from the control wheel force determiner 410 and determine whether a mechanical control jam is present based on the force measurement. In some examples, the spoiler controller 330 determines whether a mechanical control jam is present by comparing a first position of the control wheels 202, 204 to a second position of the APS 247, 249. In such examples, the spoiler controller 330 can determine whether a difference between the first position and the second position satisfies a threshold and, if not, the spoiler controller 330 can determine that a mechanical control jam is present within the aircraft roll operation control system 200.

If, at block 810, the SCE controller 140 determines that a mechanical control jam is present, then, at block 812, jam control of the aircraft 100 is invoked. For example, the pilot can exert force at the control wheels 202, 204 to invoke the jam override device 210 of FIG. 2A to resume control of the spoilers 124A-D, 126A-D in the event of a mechanical control jam. An example process and/or machine readable instructions that may be used to implement block 814 is described below in connection with FIG. 11. In response to invoking jam control of the aircraft 100 at block 812, the machine readable instructions 800 of FIG. 8 conclude.

If at block 810, the SCE controller 140 determines that a mechanical control jam is not present, then, at block 814, the FCC 142A-B determines whether autopilot is engaged. For example, the aircraft parameter determiner 420 can obtain data from the FCC interface 405 and determine whether autopilot is engaged based on the data. In such examples, the data obtained from the FCC interface 405 is used by the aircraft parameter determiner 420 to determine the aircraft parameters 450.

If at block 814, the FCC 142A-B determines that autopilot is engaged, then, at block 816, the FCC 142A-B invokes autopilot control mode of the aircraft 100. For example, the spoiler controller 330 and/or the aileron controller 430 can generate flight commands for flight control surfaces based on autopilot flight commands. An example process and/or machine readable instructions that may be used to implement block 816 is described below in connection with FIG. 9. In response to invoking autopilot control mode of the aircraft 100 at block 816, the machine readable instructions 800 of FIG. 8 conclude.

If, at block 814, the FCC 142A-B determines that autopilot is not engaged, then, at block 818, the SCE controller 140 invokes the normal control mode of the aircraft 100. For example, the spoiler controller 330 can generate flight commands for flight control surfaces based on pilot inputs. An example process and/or machine readable instructions that may be used to implement block 818 is described below in connection with FIG. 10. In response to invoking normal control mode of the aircraft 100 at block 818, the machine readable instructions 800 of FIG. 8 conclude.

At block 820, the SCE controller 140 and/or the FCC 142A-B determine whether the aircraft 100 is parked. For example, the aircraft parameter determiner 420 (FIG. 4) can determine that the aircraft 100 is parked based on the aircraft parameters 450 (FIG. 4). In such examples, the aircraft parameter determiner 420 can determine that the aircraft 100 is parked based on a ground speed of the aircraft 100 being zero, a parking brake has been engaged, etc. If, at block 820, the aircraft parameter determiner 420 determines that the aircraft is parked, then, at block 822, the SCE controller 140 and/or the FCC 142A-B conduct a PBIT to ensure that the system components remain capable of controlling the ailerons 120, 122 when both hydraulic systems 218, 220 are inoperable (e.g., low pressure). In some examples, a PBIT can be conducted at pilot discretion when the aircraft 100 is in a parked position.

In response to conducting the PBIT at block 822, or if, at block 820, the SCE controller 140 and/or the FCC 142A-B determine that the aircraft 100 is not parked, then, at block 824, the SCE controller 140 invokes alternate control mode of the aircraft 100. For example, the FCC interface 405, in response to determining that both hydraulic system 218, 220 pressure sensors 222, 224 are activated, can invoke the APU 144 of FIGS. 1-2 to power the wing actuators 242, 244 of FIG. 2A. An example process and/or machine readable instructions that may be used to implement block 824 is described below in connection with FIG. 12.

In response to invoking alternate control mode of the aircraft 100 at block 824, the machine readable instructions 800 of FIG. 8 conclude. In other examples, the machine readable instructions 800 of FIG. 8 can return to block 802 to obtain control wheel measurements in response to a condition change (e.g., a change in hydraulic pressure, a jam occurrence, a disengagement of autopilot, etc.) of the aircraft roll operation control system 200.

Figure 9:
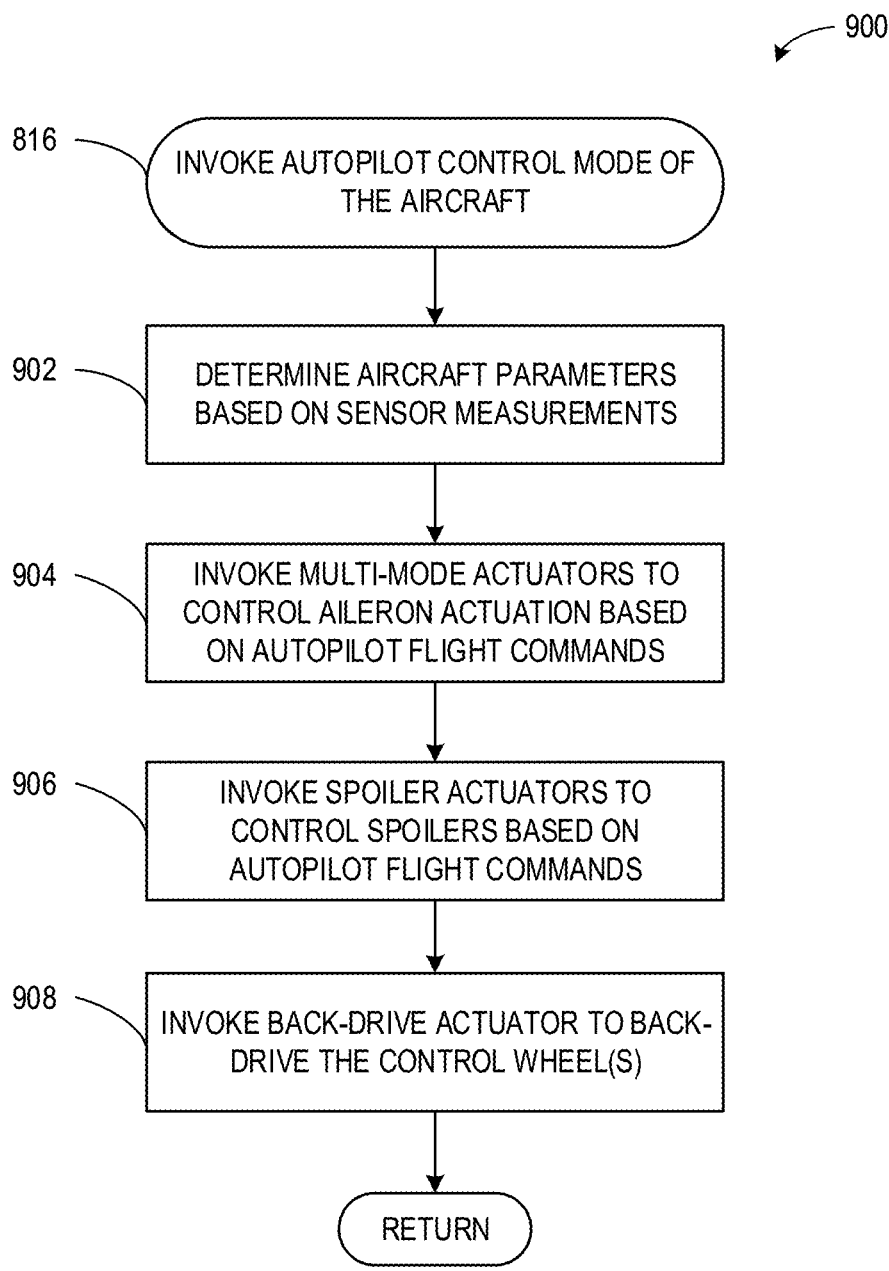
FIG. 9 is a flowchart representative of example machine readable instructions that may be executed to implement the SCE controller of FIGS. 2A and 3, the FCC of FIGS. 2A and 4, and/or, more generally, the example aircraft roll operation control system of FIG. 2A, to invoke an example autopilot control mode of the example aircraft of FIG. 1.

FIG. 9 is a flowchart representative of example machine readable instructions 900 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2A, to invoke the autopilot control mode of the aircraft 100. The machine readable instructions 900 of FIG. 9 may be executed to implement block 816 of the machine readable instructions 800 of FIG. 8. The machine readable instructions 900 of FIG. 9 begin at block 902, at which the FCC 142A-B determines the aircraft parameters 450 based on sensor measurements. For example, the aircraft parameter determiner 420 (FIG. 4) can determine one or more of the aircraft parameters 450 based on data obtained from the FCC interface 405 (FIG. 4).

At block 904, the FCC 142A-B invokes the multi-mode actuators 236A, 236B to control aileron actuation based on autopilot flight commands. For example, the aileron controller 430 (FIG. 4) can invoke the MM actuators 236A, 236B of FIG. 2A to control the aileron actuators 230, 232 of FIG. 2A that, in turn, control wing cable(s) included in the wing cable system 234 of FIG. 2A. The movement of the wing cable system 234 can control the differential linkages 246, 248 of FIG. 2A that control the ailerons 120, 122 of FIGS. 1-2. In such examples, the aileron controller 430 can control the MM actuators 236A, 236B based on autopilot flight commands generated by the aileron controller 430.

At block 906, the FCC 142A-B invokes the spoiler actuators 226A-D, 228A-D to control the spoilers 124A-D, 126A-D based on the autopilot flight commands. For example, the aileron controller 430 can invoke the spoiler actuators 226A-D, 228A-D of FIG. 2A to control the spoilers 124A-D, 126A-D of FIGS. 1-2 by transmitting the autopilot flight commands generated by the aileron controller 430 to the SCE controller 140 to control the spoilers 124A-D, 126A-D.

At block 908, the FCC 142A-B invokes a back-drive actuator to back-drive control wheel(s). For example, the FCC interface 405 can direct and/or otherwise instruct the back-drive actuator 211 of FIG. 2A to cause a displacement of one or both control wheels 202, 204 of FIG. 2A to provide visual feedback to the pilot(s) indicating that autopilot is in control of the aircraft 100 of FIG. 1. In response to invoking the back-drive actuator to back-drive the control wheel(s) at block 908, control returns to the machine readable instructions 800 of FIG. 8.

Figure 10:
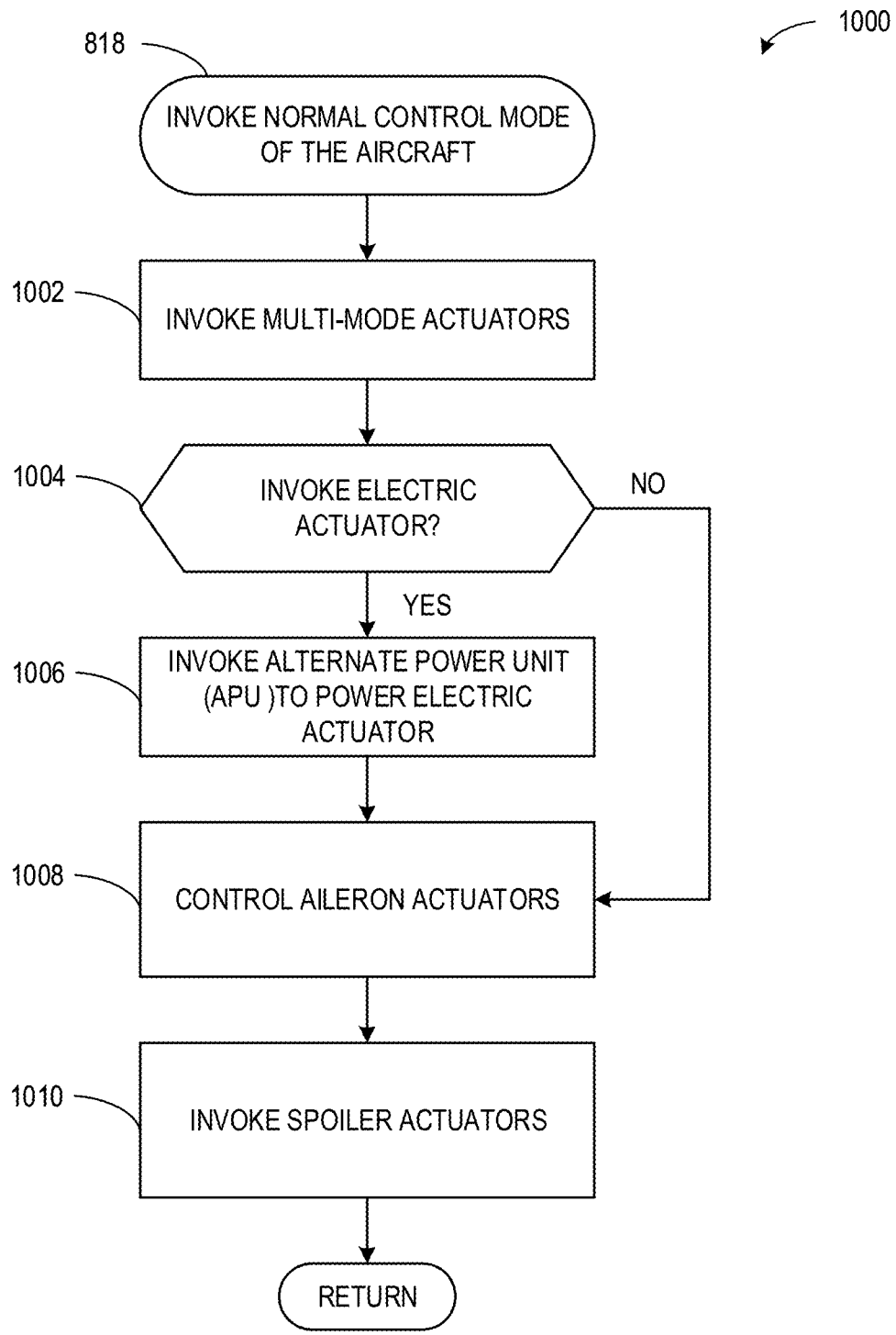
FIG. 10 is a flowchart representative of example machine readable instructions that may be executed to implement the SCE controller of FIGS. 2A and 3, the FCC of FIGS. 2A and 4, and/or, more generally, the example aircraft roll operation control system of FIG. 2A, to invoke an example normal control mode of the example aircraft of FIG. 1.

FIG. 10 is a flowchart representative of example machine readable instructions 1000 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2A, to invoke normal control mode of the aircraft 100. The machine readable instructions 1000 of FIG. 10 may be executed to implement block 818 of the machine readable instructions 800 of FIG. 8. The machine readable instructions 1000 of FIG. 10 begin at block 1002, at which the FCC 142A-B invokes multi-mode actuators. For example, the aileron controller 430 (FIG. 4) can invoke the MM actuators 236A, 236B of FIG. 2A to control the aileron actuators 230, 232 of FIG. 2A that, in turn, control one(s) of the wing cable(s) included in the wing cable system 234 of FIG. 2A. The movement of the wing cable system 234 can control the differential linkages 246, 248 of FIG. 2A that control the ailerons 120, 122 of FIGS. 1-2. In such examples, the aileron controller 430 can control the MM actuators 236A, 236B based on autopilot flight commands generated by the aileron controller 430.

At block 1004, the SCE controller 140 determines whether to invoke the electric actuator 238 of FIG. 2A. For example, the spoiler controller 330 (FIG. 3) can determine whether the MM actuators 236A, 236B of FIG. 2A are responsive to flight commands. In other examples, the spoiler controller 330 can determine whether the pilot transmitted a control signal to the spoiler controller 330 to invoke the electric actuator 238.

If, at block 1004, the SCE controller 140 determines not to invoke the electric actuator 238, control proceeds to block 1008, where the FCC 142A-B invokes the MM actuators 236A, 236B to control the aileron actuators 230, 232 based on the control wheel position of the control wheels 202, 204.

If, at block 1004, the SCE controller 140 determines to invoke the electric actuator 238, then, at block 1006, the SCE controller 140 invokes the APU 144 to power the electric actuator. For example, in response to determining that the electric actuator 238 is to be invoked, the spoiler controller 330 (FIG. 3) can invoke the APU 144 to facilitate the delivery of power and/or control signals to the electric actuator 238.

At block 1008, the FCC 142A-B and/or the SCE controller 140 control the aileron actuators. For example, at least one of the FCC 142A-B or the SCE controller 140 commands the aileron actuators 230, 232 based on the control wheel position. In such examples, the aileron controller 430 can generate flight commands based on the control wheel position to control the MM actuators 236A, 236B. The MM actuators 236A, 236B can control the aileron actuators 230, 232 that are coupled to the wing cable system 234 that is operatively coupled to the ailerons 120, 122.

At block 1010, the SCE controller 140 invokes the spoiler actuators. For example, the spoiler controller 330 can generate flight commands based on the control wheel position to invoke the spoiler actuators 226A-D, 228A-D to control the spoilers 124A-D, 126A-D. In response to invoking the spoiler actuators to control the spoilers at block 1010, control returns to the machine readable instructions 800 of FIG. 8.

Figure 11:
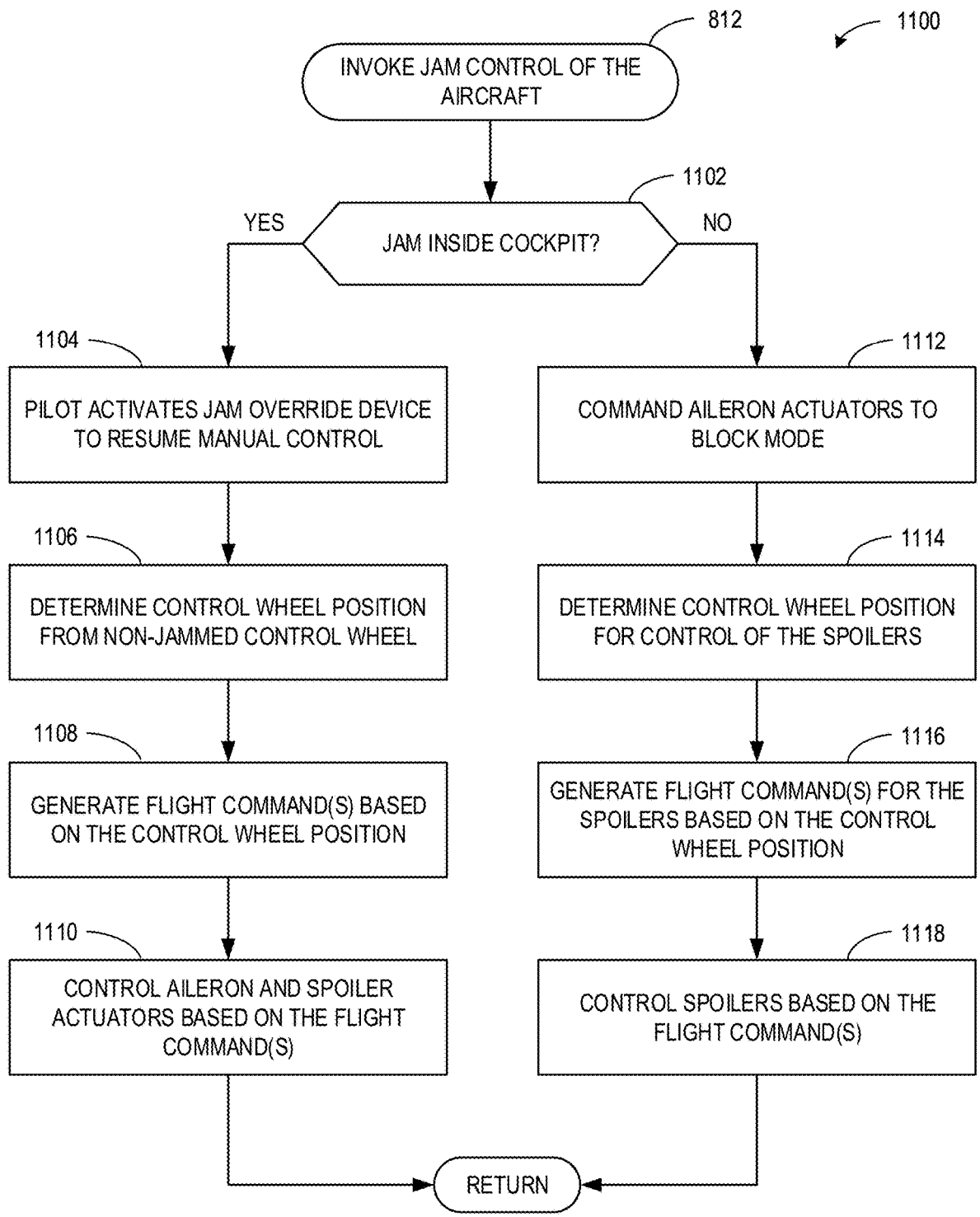
FIG. 11 is a flowchart representative of example machine readable instructions that may be executed to implement the SCE controller of FIGS. 2A and 3, the FCC of FIGS. 2A and 4, and/or, more generally, the example aircraft roll operation control system of FIG. 2A, to invoke jam control of the example aircraft of FIG. 1.

FIG. 11 is a flowchart representative of example machine readable instructions 1100 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2A, to mitigate a jam condition of the aircraft 100. The machine readable instructions 1100 of FIG. 11 may be executed to implement block 812 of the machine readable instructions 800 of FIG. 8. The machine readable instructions 1100 of FIG. 11 begin at block 1102, at which it is determined whether there is a jam inside the cockpit. For example, a jam can be detected inside the cockpit 138 or external to the cockpit 138 of FIGS. 1-2A.

If, at block 1102, the jam is inside the cockpit, control proceeds to block 1104 at which a pilot activates a jam override device to resume manual control. For example, the pilot of the aircraft 100 can exert a sufficient quantity of force at a jammed one of the control wheels 202, 204 of FIG. 2A to trigger activation of the jam override device 210 of FIG. 2A.

At block 1106, the SCE controller 140 determines the control wheel position from the non-jammed control wheel. For example, the control wheel position determiner 320 (FIG. 3) can determine the control wheel position of the non-jammed one of the control wheels 202, 204 based on data obtained from the SCE interface 310 (FIG. 3).

At block 1108, the SCE controller 140 generates flight command(s) based on the control wheel position. For example, the spoiler controller 330 (FIG. 3) can obtain the control wheel position, determined by the control wheel position determiner 320 (FIG. 3), and generate flight commands to control the spoilers 124A-D, 126A-D of FIGS. 1-2.

At block 1110, the FCC 142A-B and/or the SCE controller 140 control the aileron and spoiler actuators based on the flight command(s). For example, the SCE controller 140 can control the spoiler actuators 226A-D, 228A-D based on the flight command(s) to control the spoilers 124A-D, 126A-D. In such examples, the spoiler controller 330 (FIG. 3) can control the spoiler actuators 226A-D, 228A-D to control the movement of the spoilers 124A-D, 126A-D from a first position to a second position, a first angle to a second angle, etc., and/or a combination thereof. In other examples, the FCC 142A-B can control the aileron actuators 230, 232 to control the ailerons 120 122. In such examples, the aileron controller 430 (FIG. 4) can control the aileron actuators 230, 232 to control the movement of the ailerons 120, 122 from a first position to a second position, a first angle to a second angle, etc., and/or a combination thereof. In response to controlling the aileron and spoiler actuators based on the flight command(s) at block 1110, control returns to the machine readable instructions 800 of FIG. 8.

If, at block 1102, the jam is not inside the cockpit, control proceeds to block 1112 to command the aileron actuators to block mode. For example, the FCC 142A-B can command the aileron actuators 230, 232 to transition to block mode. In such examples, the aileron controller 430 (FIG. 4) can invoke the aileron actuators 230, 232 to enter the block mode.

At block 1114, the FCC 142A-B and/or the SCE controller 140 determine a control wheel position for control of the spoilers. For example, the control wheel force determiner 410 (FIG. 4) can read measurements from the control wheel position sensors 212, 214 to determine positions of the control wheels 202, 204.

At block 1116, the FCC 142A-B and/or the SCE controller 140 generate flight command(s) for the spoilers based on the control wheel position. For example, the aileron controller 430 can generate and transmit flight commands to the SCE controller 140 to control one(s) of the spoilers 124A-D, 126A-D, where the flight commands are based on the control wheel positions of the control wheels 202, 204. In other examples, the spoiler controller 330 (FIG. 3) can generate flight commands to control one(s) of the spoilers 124A-D, 126A-D, where the flight commands are based on the control wheel positions of the control wheels 202, 204.

At block 1118, the FCC 142A-B and/or the SCE controller 140 control the spoilers based on the flight command(s). For example, the FCC 142A-B and/or the SCE controller 140 can transmit commands to one(s) of the spoiler actuators 226A-D, 228A-D to control respective one(s) of the spoilers 124A-D, 126A-D. In response to controlling the spoilers based on the flight command(s) at block 1118, control returns to the machine readable instructions 800 of FIG. 8.

Figure 12:
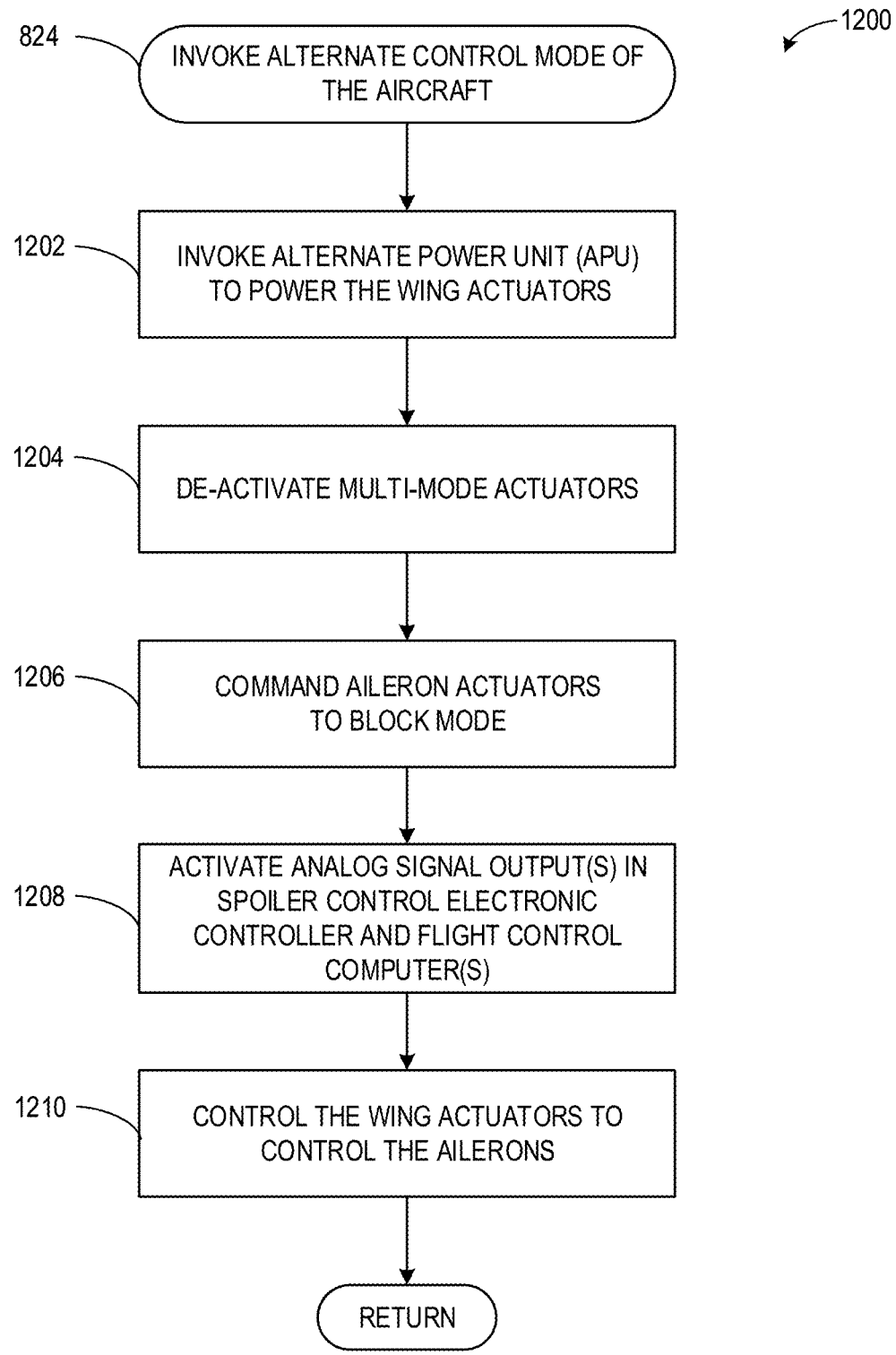
FIG. 12 is a flowchart representative of example machine readable instructions that may be executed to implement the SCE controller of FIGS. 2A and 3, the FCC of FIGS. 2A and 4, and/or, more generally, the example aircraft roll operation control system of FIG. 2A, to invoke an example alternate control mode of the example aircraft of FIG. 1.

FIG. 12 is a flowchart representative of example machine readable instructions 1200 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2A, to invoke alternate control mode of the aircraft 100. The machine readable instructions 1200 of FIG. 12 may be executed to implement block 824 of the machine readable instructions 800 of FIG. 8. The machine readable instructions 1200 of FIG. 12 begin at block 1202, at which the FCC 142A-B invokes the APU 144 to power the wing actuators 242, 244. For example, the FCC interface 405 (FIG. 4) can invoke one or more batteries 145 (e.g., by enabling one or more relays, switches, etc.) of the APU 144 of FIGS. 1-2 to transmit power to the wing actuators 242, 244. In such examples, the FCC interface 405 can direct the APU 144 to transfer power to the wing actuators 242, 244 in response to both pressure sensors 222, 224 of the hydraulic systems 218, 220 being activated and/or when the FCC 142A-B malfunctions and/or otherwise is non-responsive (e.g., a loss of power occurs).

At block 1204, the SCE controller 140 and/or the FCC 142A-B de-activate the multi-mode actuators. For example, the aileron controller 430 (FIG. 4) can turn off and/or otherwise de-activate the MM actuators 236A, 236B of FIG. 2A. In other examples, the electric actuator controller 340 (FIG. 3) can instruct the aileron controller 430 to turn off and/or otherwise de-activate the MM actuators 236A, 236B of FIG. 2A.

At block 1206, the SCE controller 140 and/or the FCC 142A-B command the aileron actuators to block mode. For example, the aileron controller 430 can remove power from one(s) of the solenoids 581A-B of FIGS. 5A-6B to invoke the aileron actuators 230, 232 (e.g., the actuator 500 of FIGS. 5A-6B) to transition and/or otherwise move to the block mode. In such examples, the FCC 142A-B can remove power from the one(s) of the solenoids 581A-B via the analog circuit 240 of FIG. 2A. In other examples, the electric actuator controller 340 can instruct the aileron controller 430 to remove power from the one(s) of the solenoids 581A-B.

At block 1208, the SCE controller 140 and/or the FCC 142A-B activate analog signal output(s). For example, the electric actuator controller 340 and/or the aileron controller 430 can activate analog signal output(s) to control the wing actuators 242, 244 via the analog circuit 240.

At block 1210, the SCE controller 140 and/or the FCC 142A-B control the wing actuators to control the ailerons. For example, the control wheel position sensors 212, 214 (FIG. 2A) can transmit an analog signal (e.g., a control wheel position measurement) to the FCC 142A-B. The FCC 142A-B can determine a position of the control wheels 202, 204 based on the analog signal. The FCC 142A-B can control the wing actuators 242, 244 to control the ailerons 120, 122 based on the position of the control wheels 202, 204 via the analog circuit 240. For example, the analog signals transmitted by the control wheel position sensors 212, 214 can be generated by pilot inputs to the control wheels 202, 204 and do not required digital conversion to be read by the FCC 142A-B. In such examples, the FCC 142A-B can control the actuation of the wing actuators 242, 244, coupled to the differential linkages 246, 248, to move the ailerons 120, 122 from a first angle to a second angle via the analog circuit 240. In response to controlling the wing actuators to control the ailerons at block 1210, control returns to the machine readable instructions 800 of FIG. 8.

Figure 13:
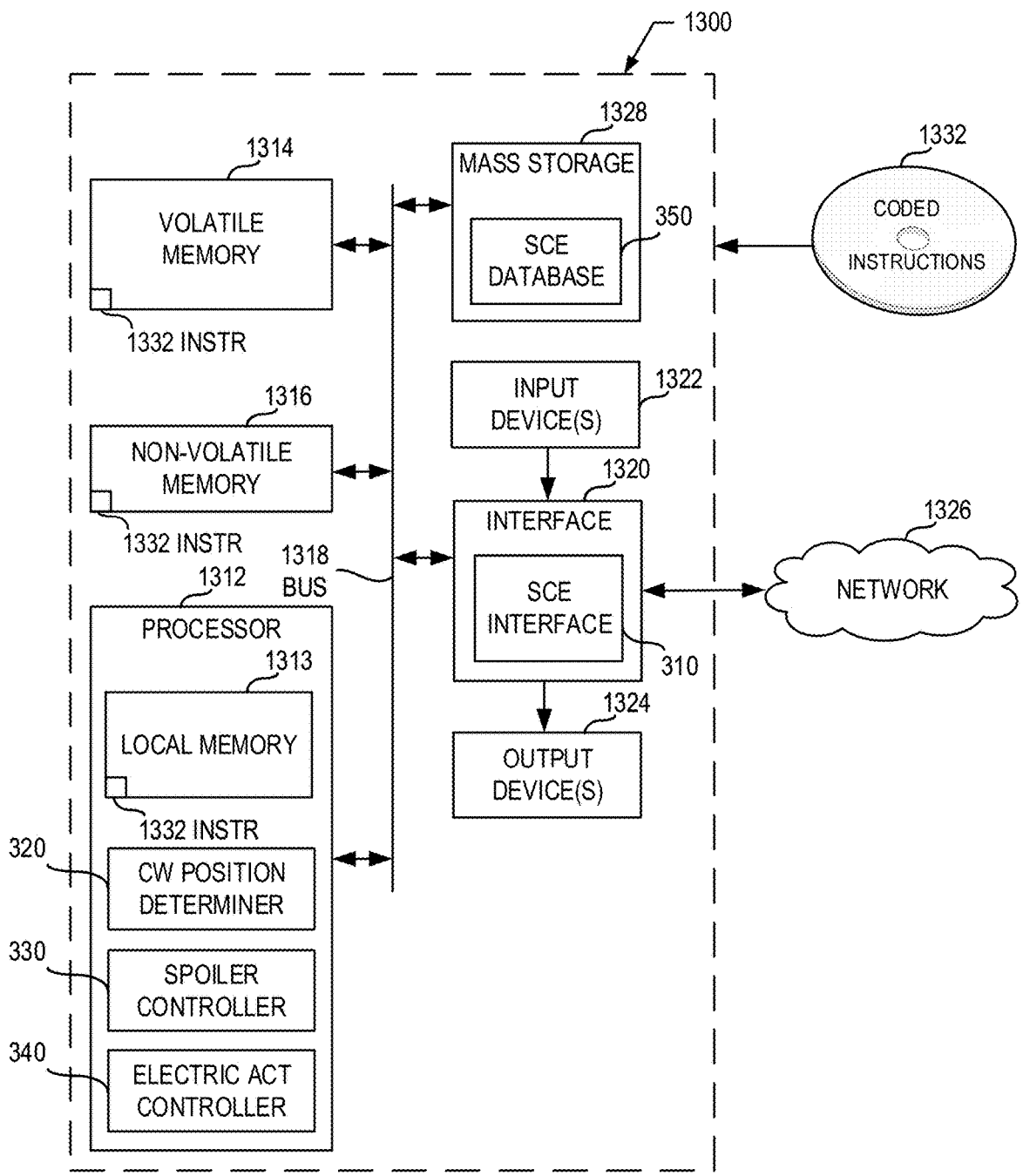
FIG. 13 is a block diagram of an example processing platform structured to execute the example machine readable instructions of FIGS. 8, 9, 10, 11, and/or 12 to implement the SCE controller of FIGS. 2A and/or 3.

FIG. 13 is a block diagram of an example processor platform 1300 structured to execute the instructions of FIGS. 8-12 to implement the SCE controller 140 of FIGS. 1, 2, and/or 3. The processor platform 1300 can be, for example, a server, an aircraft computer, an industrial computer, a remote electronic unit (REU), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example control wheel position determiner 320, the example spoiler controller 330, and the example electric actuator controller 340 of FIG. 3. In FIG. 13, the example electric actuator controller 340 is represented by "ELECTRIC ACT CONTROLLER." In FIG. 13, the example control wheel position determiner 320 is represented by CW "POSITION DETERMINER."

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by SDRAM, DRAM, RDRAM®, and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a touchscreen, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1320 implements the example SCE interface 310 of FIG. 3.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and DVD drives. In this example, the one or more mass storage devices 1328 implement the example SCE database 350 of FIG. 3.

The machine executable instructions 1332 of FIGS. 8-12 may be stored in the mass storage device 1328, in the volatile memory 1314, in the non-volatile memory 1316, and/or on a removable non-transitory computer readable storage medium such as a CD or DVD.

Figure 14:
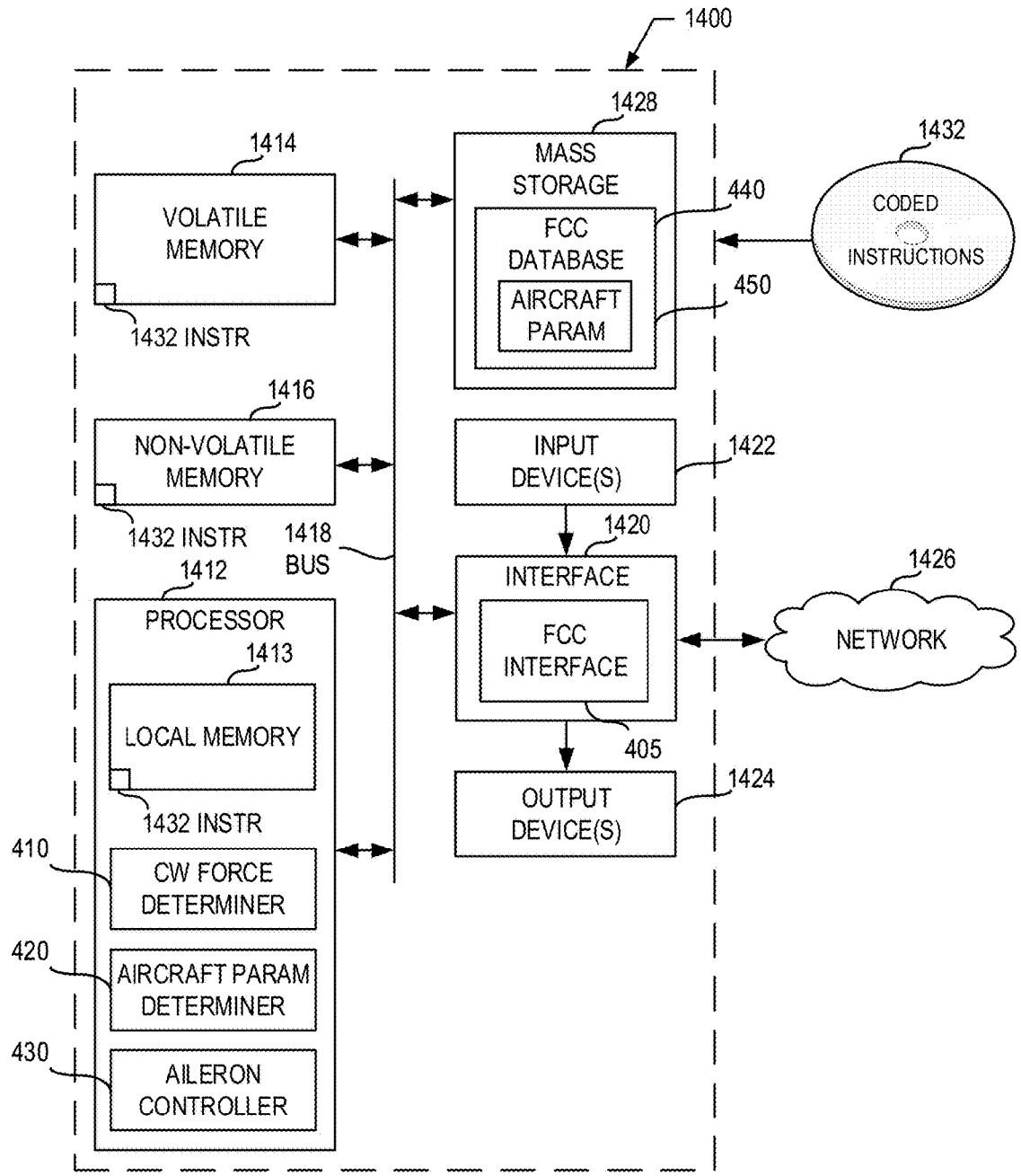
FIG. 14 is a block diagram of an example processing platform structured to execute the example machine readable instructions of FIGS. 8, 9, 10, 11, and/or 12 to implement the FCC of FIGS. 2A and/or 4.

FIG. 14 is a block diagram of an example processor platform 1400 structured to execute the instructions of FIGS. 8-12 to implement the FCC 142A-B of FIGS. 1, 2, and/or 4. The processor platform 1400 can be, for example, a server, an aircraft computer, an industrial computer, a REU, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example control wheel force determiner 410, the example aircraft parameter determiner 420, and the example aileron controller 430 of FIG. 4. In FIG. 14, the example control wheel force determiner 410 is represented by "CW FORCE DETERMINER." In FIG. 14, the example aircraft parameter determiner 420 is represented by "AIRCRAFT PARAM DETERMINER."

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by SDRAM, DRAM, RDRAM®, and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a USB, a Bluetooth® interface, an NFC interface, and/or a PCI express interface.

In the illustrated example, one or more input devices 1422 are connected to the interface circuit 1420. The input device(s) 1422 permit(s) a user to enter data and/or commands into the processor 1412. The input device(s) 1422 can be implemented by, for example, an audio sensor, a microphone, a camera (still or video), a keyboard, a button, and/or a voice recognition system.

One or more output devices 1424 are also connected to the interface circuit 1420 of the illustrated example. The output devices 1424 can be implemented, for example, by display devices (e.g., a LED, an OLED, a LCD, a CRT, an IPS display, a touchscreen, etc.), a tactile output device, and/or speaker. The interface circuit 1420 of the illustrated example, thus, typically includes a graphics driver card, a graphics driver chip, and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a DSL connection, a telephone line connection, a coaxial cable system, a satellite system, a line-of-site wireless system, a cellular telephone system, etc. In this example, the interface circuit 1420 implements the example FCC interface 405 of FIG. 4.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and DVD drives. In this example, the one or more mass storage devices 1428 implement the example FCC database 440 and the example aircraft parameters 450 of FIG. 4. In FIG. 14, the example aircraft parameters 450 are represented by "AIRCRAFT PARAM."

The machine executable instructions 1432 of FIGS. 8-12 may be stored in the mass storage device 1428, in the volatile memory 1414, in the non-volatile memory 1416, and/or on a removable non-transitory computer readable storage medium such as a CD or DVD.

From the foregoing, it will be appreciated that the above systems, methods, apparatus, and articles of manufacture control roll operations of an aircraft by counteracting a hydraulic system malfunction (e.g., a loss of hydraulic pressure), a mechanical control jam, or a non-responsive control system component. The example systems, methods, apparatus, and articles of manufacture can detect a hydraulic system pressure loss and passively transfer aircraft flight control to an analog circuit to enable control of the aircraft ailerons without intervention by one or more processors and/or, more generally, one or more processor-based devices. The example systems, methods, apparatus, and articles of manufacture reduces a need for direct mechanical flight controls and includes backup components and/or procedures to control flight control surfaces in the event of a mechanical control jam or a non-responsive control system component to improve flight control of an aircraft.

Example methods, apparatus, systems, and articles of manufacture to control aircraft roll operations are disclosed herein. Further examples and combinations thereof include the following:

Example 1 includes a system for controlling aircraft roll operations, the system comprising a wing actuator coupled to an aileron of an aircraft, an alternate power unit (APU), a control wheel position sensor to measure a control wheel position of a control wheel of the aircraft, a flight control computer (FCC) coupled to the APU and the control wheel position sensor, the FCC to invoke the APU to provide power to the wing actuator, and transmit a control signal to the wing actuator, the control signal to invoke the wing actuator to control the aileron based on the control wheel position, and a differential linkage coupled to the wing actuator and the aileron, the differential linkage to convert first movement of the wing actuator into second movement to control the aileron, the first movement of the wing actuator based on the control wheel position.

Example 2 includes the system of example 1, wherein the FCC is to determine aircraft parameters associated with the aircraft, and further including, in response to the FCC determining that the aircraft is in autopilot control mode, the FCC is to generate autopilot flight commands based on the aircraft parameters, and further including a multi-mode actuator coupled to the FCC and an aileron actuator, the multi-mode actuator to control the aileron actuator based on the autopilot flight commands, a wing cable system coupled to the aileron actuator and the aileron, and the aileron actuator to control the wing cable system based on actuation of the multi-mode actuator.

Example 3 includes the system of example 1 or example 2, wherein the FCC is to determine aircraft parameters associated with the aircraft, and further including, in response to the FCC determining that the aircraft is in autopilot control mode, the FCC is to generate autopilot flight commands based on the aircraft parameters, and further including a spoiler, and a spoiler actuator coupled to a spoiler control electronic controller, the FCC, and the spoiler, the spoiler actuator to control the spoiler based on the autopilot flight commands.

Example 4 includes the system of any of examples 1-3, further including, in response to the FCC determining that the aircraft is in normal control mode, the FCC is to generate flight commands based on the control wheel position, and further including a multi-mode actuator coupled to the FCC and an aileron actuator, the multi-mode actuator to control the aileron actuator based on the flight commands, a wing cable system coupled to an aileron, and the aileron actuator coupled to the wing cable system, the aileron actuator to control the wing cable system to displace the aileron.

Example 5 includes the system of example 4, wherein the multi-mode actuator is a first multi-mode actuator, and wherein the FCC is to, in response to a pilot input in normal control mode, disable a second multi-mode actuator, and further including an electric actuator coupled to the aileron actuator, the electric actuator and the first multi-mode actuator to control the aileron actuator.

Example 6 includes the system of any of examples 1-5, further including, in response to the FCC determining that the aircraft is in normal control mode a spoiler control electronic (SCE) controller to generate flight commands based on the control wheel position, and a spoiler actuator coupled to the SCE controller and a spoiler, the spoiler actuator to control the spoiler based on the flight commands.

Example 7 includes the system of any of examples 1-6, wherein the control wheel is a jammed control wheel, the control wheel position is a first control wheel position, and the FCC is to determine that the aircraft is in jam control mode by detecting a mechanical control jam, and further including a jam override device to provide force to a non jammed control wheel in response to the detection of the mechanical control jam, a spoiler control electronic (SCE) controller to generate flight commands based on a second control wheel position of the non-jammed control wheel, and a spoiler actuator coupled to the SCE controller and a spoiler, the spoiler actuator to control the spoiler based on the flight commands.

Example 8 includes a method for controlling aircraft roll operations, the method comprising instructing an alternate power unit (APU) to transmit power to a wing actuator based on an operating condition of an aircraft, measuring a control wheel position of a control wheel of the aircraft, and in response to first movement of the wing actuator being converted into second movement based on the control wheel position, controlling an aileron of the aircraft based on the second movement, the aileron coupled to the wing actuator.

Example 9 includes the method of example 8, wherein a flight control computer (FCC) is to determine aircraft parameters associated with the aircraft, and further including, in response to the FCC determining that the aircraft is in autopilot control mode generating autopilot flight commands based on the aircraft parameters, controlling a multi-mode actuator, the multi-mode actuator to control an aileron actuator based on the autopilot flight commands, the aileron actuator coupled to a wing cable system, and controlling the aileron actuator, the aileron actuator to control the wing cable system based on actuation of the multi-mode actuator, the wing cable system coupled to the aileron.

Example 10 includes the method of example 8 or 9, wherein a flight control computer (FCC) is to determine aircraft parameters associated with the aircraft, and further including, in response to the FCC determining that the aircraft is in autopilot control mode generating autopilot flight commands based on the aircraft parameters, and controlling, with a spoiler control electronic controller, a spoiler actuator, the spoiler actuator to control a spoiler based on the autopilot flight commands.

Example 11 includes the method of any of examples 8-10, further including, in response to a flight control computer (FCC) determining that the aircraft is in normal control mode generating flight commands based on the control wheel position, controlling a multi-mode actuator, the multi-mode actuator to control an aileron actuator based on the flight commands, the aileron actuator coupled to a wing cable system, and controlling the aileron actuator, the aileron actuator to control the wing cable system based on actuation of the multi-mode actuator, the wing cable system coupled to the aileron.

Example 12 includes the method of example 11, wherein the multi-mode actuator is a first multi-mode actuator, and the FCC is to, in response to at least one of abnormal pressure or a loss of pressure of a first hydraulic system of two or more hydraulic systems in the normal control mode, disable a second multi-mode actuator, and further including controlling an electric actuator to control the aileron actuator based on the flight commands.

Example 13 includes the method of any of examples 8-12, wherein the control wheel position is a first control wheel position, the control wheel is a jammed control wheel, the aileron is a first aileron, the aircraft is in jam control mode by detecting a mechanical control jam in a cockpit of the aircraft, and further including in response to detecting the mechanical control jam, overriding a jam override device to provide force to a non-jammed control wheel, generating flight commands based on a second control wheel position of the non-jammed control wheel, controlling a spoiler actuator to control a spoiler based on the flight commands, and controlling a first aileron actuator and a second aileron actuator to control the first aileron and a second aileron based on the flight commands.

Example 14 includes a system for controlling operation of an aileron of an aircraft, the system comprising an aileron actuator including a mode selector valve to control fluid flow through the aileron actuator, the mode selector valve configured to be in an active position to allow fluid flow through the aileron actuator, and a valve spring coupled to the mode selector valve, the valve spring to adjust the mode selector valve from the active position to a block position, the block position to prevent fluid flow through the aileron actuator, a wing cable system coupled to the aileron actuator, a wing actuator coupled to the wing cable system, the wing actuator to control displacement of the aileron of the aircraft in response to the mode selector valve being in the block position, and a differential linkage coupled to the wing actuator and the aileron, the differential linkage to translate the displacement of the wing actuator into rotational movement to adjust the aileron from a first position to a second position.

Example 15 includes the system of example 14, wherein, in response to the mode selector valve being in the block position, the aileron actuator to move to block mode to immobilize the wing cable system.

Example 16 includes the system of example 14 or 15, further including a flight control computer to, in response to the mode selector valve being commanded to the block position, obtain a control signal from the aileron actuator and invoke an alternate power unit to power the wing actuator.

Example 17 includes the system of any of examples 14-16, wherein the aileron actuator includes a first chamber and a second chamber to maintain constant volumes in response to the mode selector valve being in the block position, and the mode selector valve is to include a first port, a second port, a third port, and a fourth port, the second port coupled to the first chamber, the fourth port coupled to the second chamber.

Example 18 includes the system of any of examples 14-17, wherein the aileron actuator includes a solenoid valve coupled to the mode selector valve, the solenoid valve including a first solenoid chamber and a second solenoid chamber, the first solenoid chamber including a first solenoid valve port, a second solenoid valve port, and a third solenoid valve port, the second solenoid chamber including a fourth solenoid valve port, a fifth solenoid valve port, and a sixth solenoid valve port.

Example 19 includes the system of example 18, wherein the first solenoid chamber is coupled to the mode selector valve in response to one or more hydraulic systems being responsive, the first solenoid valve port coupled to a control port of the mode selector valve, the second solenoid valve port coupled to a supply line, and the third solenoid valve port coupled to a port of the mode selector valve and a chamber of the aileron actuator.

Example 20 includes the system of example 18 or 19, wherein the second solenoid chamber is coupled to the mode selector valve in response to two or more hydraulic systems being non-responsive, the fourth solenoid valve port coupled to a control port of the mode selector valve, the fifth solenoid valve port coupled to a supply line, and the sixth solenoid valve port coupled to a port of the mode selector valve and a chamber of the aileron actuator.

Example 21 includes the system of any of examples 14-20, wherein the system mitigates an effect of generic error or common mode failure when the aileron is controlled by the wing actuator in an alternate control mode.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system for controlling operation of an aileron of an aircraft, the system comprising:
    an aileron actuator including:
        a mode selector valve to control fluid flow through the aileron actuator, the mode selector valve to allow fluid flow through the aileron actuator when the mode selector valve is in an active position and to prevent fluid flow through the aileron actuator when the mode selector valve is in a block position; and a valve spring to adjust the mode selector valve from the active position to the block position;
a wing cable system to move the aileron of the aircraft when the mode selector valve is in the active position, the wing cable system to be displaced by the aileron actuator;
a differential linkage to translate the displacement of the wing cable system to movement of the aileron; and
a wing actuator to move the aileron of the aircraft via the differential linkage when the mode selector valve is in the block position.

2. The system of claim 1, wherein the aileron actuator includes a solenoid valve coupled to the mode selector valve, the solenoid valve including a first solenoid chamber and a second solenoid chamber, the first solenoid chamber including a first solenoid valve port, a second solenoid valve port, and a third solenoid valve port, the second solenoid chamber including a fourth solenoid valve port, a fifth solenoid valve port, and a sixth solenoid valve port.

3. The system of claim 2, wherein the first solenoid chamber is coupled to the mode selector valve in response to one or more hydraulic systems being responsive, the first solenoid valve port coupled to a control port of the mode selector valve, the second solenoid valve port coupled to a supply line, and the third solenoid valve port coupled to a port of the mode selector valve and a chamber of the aileron actuator.

4. The system of claim 2, wherein the second solenoid chamber is coupled to the mode selector valve in response to two or more hydraulic systems being non-responsive, the fourth solenoid valve port coupled to a control port of the mode selector valve, the fifth solenoid valve port coupled to a supply line, and the sixth solenoid valve port coupled to a port of the mode selector valve and a chamber of the aileron actuator.

5. The system of claim 1, wherein, when the mode selector valve is in the block position, the aileron actuator is restricted from displacing the wing cable system.

6. The system of claim 1, further including a flight control computer to, when the mode selector valve is commanded to the block position, obtain a control signal from the aileron actuator and invoke an alternate power unit to power the wing actuator.

7. The system of claim 1, wherein the aileron actuator includes a first chamber and a second chamber to maintain constant volumes in response to the mode selector valve being in the block position, and the mode selector valve includes a first port, a second port, a third port, and a fourth port, the second port coupled to the first chamber, the fourth port coupled to the second chamber.

8. A system for controlling operation of an aileron of an aircraft, the system comprising:
an aileron actuator including:
a mode selector valve to control fluid flow through the aileron actuator, the mode selector valve to allow fluid flow through the aileron actuator when the mode selector valve is in an active position and to prevent fluid flow through the aileron actuator when the mode selector valve is in a block position; and
a valve spring to adjust the mode selector valve from the active position to a block position; and
a wing cable system to move the aileron of the aircraft when the mode selector valve is in the active position, the wing cable system to be displaced by the aileron actuator.

9. The system of claim 8, further including a differential linkage to translate the displacement of the wing cable system to movement of the aileron.

10. The system of claim 9, further including a wing actuator to move the aileron of the aircraft via the differential linkage when the mode selector valve is in the block position.

11. The system of claim 10, wherein the differential linkage is to translate displacement of the wing actuator into rotational movement to adjust a position of the aileron.

12. The system of claim 8, wherein the aileron actuator includes a solenoid valve coupled to the mode selector valve, the solenoid valve including a first solenoid chamber and a second solenoid chamber, the first solenoid chamber including a first solenoid valve port, a second solenoid valve port, and a third solenoid valve port, the second solenoid chamber including a fourth solenoid valve port, a fifth solenoid valve port, and a sixth solenoid valve port.

13. The system of claim 12, wherein the first solenoid chamber is coupled to the mode selector valve in response to one or more hydraulic systems being responsive, the first solenoid valve port coupled to a control port of the mode selector valve, the second solenoid valve port coupled to a supply line, and the third solenoid valve port coupled to a port of the mode selector valve and a chamber of the aileron actuator.

14. The system of claim 12, wherein the second solenoid chamber is coupled to the mode selector valve in response to two or more hydraulic systems being non-responsive, the fourth solenoid valve port coupled to a control port of the mode selector valve, the fifth solenoid valve port coupled to a supply line, and the sixth solenoid valve port coupled to a port of the mode selector valve and a chamber of the aileron actuator.

15. The system of claim 8, wherein, when the mode selector valve is in the block position, the aileron actuator is restricted from displacing the wing cable system.

16. The system of claim 8, wherein the aileron actuator includes a first chamber and a second chamber to maintain constant volumes when the mode selector valve is in the block position, and the mode selector valve includes a first port, a second port, a third port, and a fourth port, the second port coupled to the first chamber, the fourth port coupled to the second chamber.

17. A method for controlling operation of an aileron of an aircraft, the method comprising:
moving, via an aileron actuator, the aileron, the aileron actuator connected to the aileron via a wing cable system, the wing cable system to be displaced by the aileron actuator, a differential linkage to translate displacement of the wing cable system to movement of the aileron;
moving, via a valve spring, a valve from an active position to a block position, the valve to enable fluid flow through the aileron actuator when the valve is in the active position, the valve to prevent fluid flow through the aileron actuator when the valve is in the block position; and
moving, via a wing actuator, the aileron, the wing actuator coupled to the aileron via the differential linkage to translate displacement of the wing actuator to movement of the aileron when the valve is in the block position.

18. The method of claim 17, wherein the valve is coupled to the valve spring, and further including adjusting the valve spring to cause the moving of the valve from the active position to the block position.

19. The method of claim 17, wherein, when the valve is in the block position, the aileron actuator is restricted from displacing the wing cable system.

20. The method of claim 17, further including translating the displacement of the wing actuator into rotational movement with the differential linkage.

\* \* \* \* \*